United States Patent [19]
Fields, Jr. et al.

[11] Patent Number: 6,049,841
[45] Date of Patent: Apr. 11, 2000

[54] METHOD AND APPARATUS OF SELECTING DATA TRANSMISSION CHANNELS

[75] Inventors: James Stephen Fields, Jr.; Guy Lynn Guthrie, both of Austin, Tex.

[73] Assignee: International Business Machines Corporation, Armonk, N.Y.

[21] Appl. No.: 09/085,196

[22] Filed: May 27, 1998

Related U.S. Application Data

[62] Division of application No. 08/966,873, Nov. 10, 1997.

[51] Int. Cl.$^7$ .................................................. G06F 13/30
[52] U.S. Cl. ............................ 710/28; 710/111; 710/244
[58] Field of Search ................................... 710/1, 22, 23, 710/28, 36, 107, 113, 129, 111, 40, 116, 244, 123, 240

[56] References Cited

U.S. PATENT DOCUMENTS

| | | |
|---|---|---|
| 4,811,337 | 3/1989 | Hart . |
| 4,845,706 | 7/1989 | Franaszek . |
| 4,987,536 | 1/1991 | Humblet . |
| 5,018,133 | 5/1991 | Tsukakoshi et al. . |
| 5,079,767 | 1/1992 | Perlman . |
| 5,111,425 | 5/1992 | Takeuchi et al. ......................... 710/22 |
| 5,150,360 | 9/1992 | Perlman et al. . |
| 5,245,609 | 9/1993 | Ofek et al. . |
| 5,353,412 | 10/1994 | Douglas et al. . |
| 5,379,280 | 1/1995 | Cotton et al. ........................... 370/268 |
| 5,396,602 | 3/1995 | Amini et al. . |
| 5,450,551 | 9/1995 | Amini et al. . |
| 5,491,508 | 2/1996 | Friedell et al. ........................... 348/16 |
| 5,517,671 | 5/1996 | Parks et al. .............................. 710/40 |
| 5,522,050 | 5/1996 | Amini et al. . |
| 5,550,989 | 8/1996 | Santos . |
| 5,559,986 | 9/1996 | Stancil et al. . |
| 5,564,026 | 10/1996 | Amini et al. . |
| 5,579,483 | 11/1996 | Imai ....................................... 370/431 |
| 5,590,377 | 12/1996 | Smith et al. . |
| 5,596,729 | 1/1997 | Lester et al. . |
| 5,613,162 | 3/1997 | Kabenjian . |
| 5,619,728 | 4/1997 | Jones et al. . |
| 5,675,732 | 10/1997 | Majeti et al. ....................... 395/200.65 |
| 5,765,024 | 6/1998 | Riley ....................................... 710/22 |

*Primary Examiner*—Xuan M. Thai
*Attorney, Agent, or Firm*—Volel Emile

[57] ABSTRACT

An apparatus and method of assigning communication channels for transmitting data through a host bridge are provided. In a preferred embodiment, a determination is made as to whether data is being transmitted through any one of the channels. If data is not being transmitted through one the channels, that channel is designated as the transmission channel for the present data transaction. If data is being transmitted through all of the channels, a least most recently used channel is selected as the data transmission channel. If however, more than one channel is not transmitting data, the data transmission channel assignments are made among the idle channels from a lowest channel number (e.g., channel 0) to a highest channel number (e.g., channel 7) or vice versa.

6 Claims, 23 Drawing Sheets

INPUTS:
    ACC_CH0, /* indicates that Channel 0 is being accessed (becoming the MRU)*/
    ACC_CH1, /* indicates that Channel 1 is being accessed (becoming the MRU)*/
    ACC_CH2, /* indicates that Channel 2 is being accessed (becoming the MRU)*/
    ACC_CH3, /* indicates that Channel 3 is being accessed (becoming the MRU)*/
    ACC_CH4, /* indicates that Channel 4 is being accessed (becoming the MRU)*/
    ACC_CH5, /* indicates that Channel 5 is being accessed (becoming the MRU)*/
    ACC_CH6, /* indicates that Channel 6 is being accessed (becoming the MRU)*/
    ACC_CH7, /* indicates that Channel 7 is being accessed (becoming the MRU)*/
    CH_0_EN, /* indicates that this channel may be assigned in this cyc   */
    CH_1_EN, /* indicates that this channel may be assigned in this cyc   */
    CH_2_EN, /* indicates that this channel may be assigned in this cyc   */
    CH_3_EN, /* indicates that this channel may be assigned in this cyc   */
    CH_4_EN, /* indicates that this channel may be assigned in this cyc   */
    CH_5_EN, /* indicates that this channel may be assigned in this cyc   */
    CH_6_EN, /* indicates that this channel may be assigned in this cyc   */
    CH_7_EN, /* indicates that this channel may be assigned in this cyc   */
    POR    , /* system reset    */
    CLOCK : /* system clock    */
OUTPUTS:
    SEL_CH_0 , /* this channel has been assigned by the LRU   */
    SEL_CH_1 , /* this channel has been assigned by the LRU   */
    SEL_CH_2 , /* this channel has been assigned by the LRU   */
    SEL_CH_3 , /* this channel has been assigned by the LRU   */
    SEL_CH_4 , /* this channel has been assigned by the LRU   */
    SEL_CH_5 , /* this channel has been assigned by the LRU   */
    SEL_CH_6 , /* this channel has been assigned by the LRU   */
    SEL_CH_7 , /* this channel has been assigned by the LRU   */

/* Start of Logic Code: (syntax) '|' means OR; '&' means AND; 'GATE' is a select indication */

TREE_SEL_SET(0:6) = (ACC_CH_0   GATE B'1101000')
                           | (ACC_CH_1   GATE B'1100000')
                           | (ACC_CH_2   GATE B'1000100')
                           | (ACC_CH_3   GATE B'1000000')
                           | (ACC_CH_4   GATE B'0010010')
                           | (ACC_CH_5   GATE B'0010000')
                           | (ACC_CH_6   GATE B'0000001')
                           | (ACC_CH_7   GATE B'0000000')

TREE_SEL_SET(0:6) =           (POR          GATE  B'1111111')
                       |      (ACC_CH_0     GATE  B'0000000')
                       |      (ACC_CH_1     GATE  B'0001000')
                       |      (ACC_CH_2     GATE  B'0100000')
                       |      (ACC_CH_3     GATE  B'0100100')
                       |      (ACC_CH_4     GATE  B'1000000')
                       |      (ACC_CH_5     GATE  B'1000010')
                       |      (ACC_CH_6     GATE  B'1010000')
                       |      (ACC_CH_7     GATE  B'1010001')

NS_TREE_SEL(0:6) =  TREE_SEL_SET(0:6)
                       |      ( TREE_SEL_REG(0:6)
                              & ^TREESEL_RESET(0:6)
                              );

DEVICE TREE_LATCH: REGISTER
NS_TREE_SEL(0:6)............         ILAT_INPUT         |
CLOCK................ ILAT_CLOCK    |
                                    | LAT_OUTPUT|.......TREE_SEL_REG(0:6)

TREE_SEL(6) =                 ( TREE_SEL_REG(6) & CH_7_EN ) | ^CH_6_EN;
TREE_SEL(5) =                 ( TREE_SEL_REG(5) & CH_5_EN ) | ^CH_4_EN;
TREE_SEL(4) =                 ( TREE_SEL_REG(4) & CH_3_EN ) | ^CH_2_EN;
TREE_SEL(3) =                 ( TREE_SEL_REG(3) & CH_1_EN ) | ^CH_0_EN;

TREE_SEL(2) =                 ( TREE_SEL_REG(2) & CH_6_EN | CH_7_EN ))
                       |      (^CH_4_EN & ^CH_5_EN );

TREE_SEL(1) =                 ( TREE_SEL_REG(1) &(CH_2_EN | CH_3_EN ))
                       |      (^CH_0_EN & ^CH_1_EN );

TREE_SEL(0) =                 ( TREE_SEL_REG(0) & CH_4_EN | CH_5_EN | CH_6_EN | CH_7_EN ))
                       |      (^CH_0_EN & ^CH_1_EN & ^CH_2_EN & ^CH_3_EN );

```
SEL_CH_0 =      ^TREE_SEL(0) & ^TREE_SEL(1) & ^TREE_SEL(3) & CH_0_EN;
SEL_CH_1 =      ^TREE_SEL(0) & ^TREE_SEL(1) &  TREE_SEL(3) & CH_1_EN;
SEL_CH_2 =      ^TREE_SEL(0) &  TREE_SEL(1) & ^TREE_SEL(4) & CH_2_EN;
SEL_CH_3 =      ^TREE_SEL(0) &  TREE_SEL(1) &  TREE_SEL(4) & CH_3_EN;
SEL_CH_4 =       TREE_SEL(0) & ^TREE_SEL(2) & ^TREE_SEL(5) & CH_4_EN;
SEL_CH_5 =       TREE_SEL(0) & ^TREE_SEL(2) &  TREE_SEL(5) & CH_5_EN;
SEL_CH_6 =       TREE_SEL(0) &  TREE_SEL(2) & ^TREE_SEL(6) & CH_6_EN;
SEL_CH_7 =       TREE_SEL(0) &  TREE_SEL(2) &  TREE_SEL(6) & CH_7_EN;

END DESIGN;
```

FIG. 9C

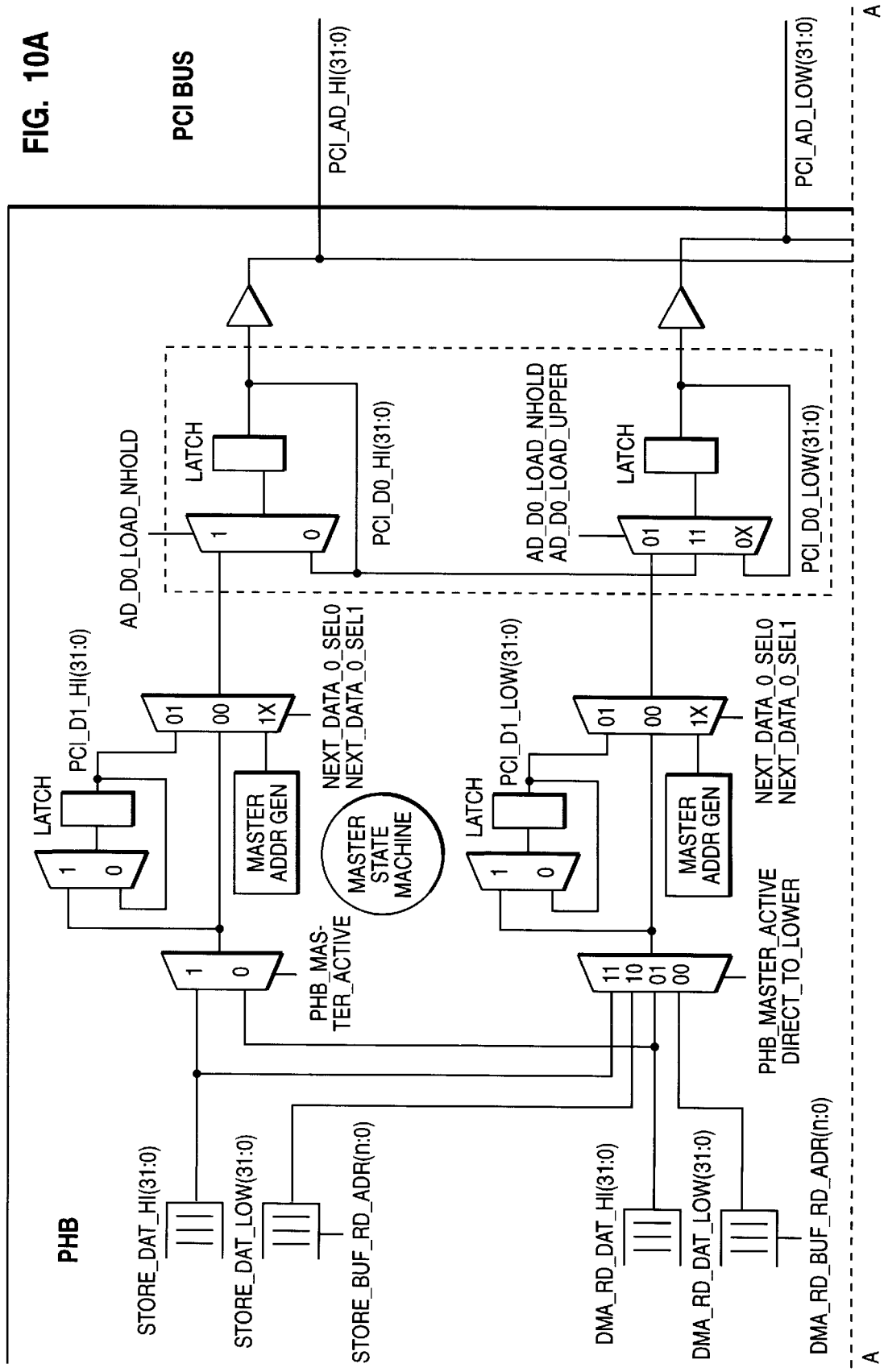

```
/*————— MISC Equations needed for Outbound MUX Select logic —————*/
TRANSACT_UNLATCHED =   IRDY_UNLATCHED & TRDY_UNLATCHED;

TRANSACT_LATCHED =    (PHB_MASTER_ACTIVE
                       & TRDY_LATCHED
                       & IRDY_OUT_L_DLY1
                      )
                    | (PHB_TARGET_ACTIVE
                       & IRDY_LATCHED
                       & TRDY_OUT_L_DLY1
                      ) ;

DATA_VALID =  (PRELOAD_CYCLE1 | PRELOAD_CYCLE2)
            | (^PRELOAD
               & OUTBOUND_CMD         /* PHB is master sending write data or PHB is target sending read data*/
               & TRANSACT_LAT
              ) ;
```

FIG. 11A

```
/*——— Outbound MUX Select logic ———*/
DIRECT_TO_LOWER =    PRELOAD_CYCLE1
                   & ADDR_GEN_WORD_ODD_NEVEN  ;     /* Addr(2) of addr(31:0) is a 1: odd 4byte word */

AD_D1_LOAD_NHOLD =   DATA_VALID
                  &
                     ( ( ADDR_GEN_WORD_ODD_NEVEN       /* Addr(2) of addr(31:0) is a 1: odd 4byte word */
                         & ^ACK64_EN                    /* Involved with a 32 bit PCI transfer       */
                       )
                       | ACK64_EN                       /* Involved with a 64 bit PCI transfer       */
                       | PRELOAD_CYCLE1
                       | PRELOAD_CYCLE2
                     )  ;

NEXT_DATA_O_SEL0 =   PHB_MASTER_ACTIVE
                   & MASTER_SEND_ADDR ;

NEXT_DATA_O_SEL1 =   ^AD_D1_LOAD_NHOLD;
```

FIG. 11B

```
AD_D0_LOAD_UPPER =    ( PHB_MASTER_ACTIVE | PHB_TARGET_ACTIVE )
                    & ^ACK64_EN                              /* Involved with a 32 bit PCI transfer      */
                    & ( ( ^ADDR_GEN_WORD_ODD_NEVEN    ;      /* Addr(2) of addr(31:0) is a 0: even 4byte word */
                        & ^TRANSACT_LAT
                        & ^PRELOAD_CYCLE1
                        )
                      |
                        ( ADDR_GEN_WORD_ODD_NEVEN     ;      /* Addr(2) of addr(31:0) is a 1: odd 4byte word */
                        & TRANSACT_LAT
                        )
                      ) ;

AD_D0_LOAD_NHOLD =    ( PHB_MASTER_ACTIVE | PHB_TARGET_ACTIVE )
                    & ( PRELOAD_CYCLE1
                      | TRANSACT_UNLATCHED
                      ) ;

/*————— BUFFER RD ADDR INCR ————*/
STORE_BUF_RD_ADR_INCR =  AD_D1_LOAD_NHOLD;               /* Incr read addr to buffer to next 8 byte location */

DMA_RD_BUF_RD_ADR_INCR = AD_D1_LOAD_NHOLD;               /* Incr read addr to buffer to next 8 byte location */
```

FIG. 11C

METHOD AND APPARATUS OF SELECTING DATA TRANSMISSION CHANNELS

This is a divisional of U.S. application Ser. No. 08/966,873, filed on Nov. 10, 1997, now pending.

BACKGROUND OF THE INVENTION

1. Field of the Invention

The present invention relates generally to a data transfer device and, more particularly, to a peripheral component interconnect (PCI) host bridge device.

2. Description of the Related Art

In 1995, version 2.0 of the peripheral component interconnect (PCI) bus specification was replaced by version 2.1. This new version introduced new requirements intended to better control bus latency and performance. For example, the new version only allows a certain amount of cycles during which a PCI target device has to transfer data in response to a request from a master device. If the target device cannot respond within the allowable time (e.g., 16 cycles), then the target device must instruct the master device to resend the request at a later time. This 16-cycle constraint is intended to free the PCI bus for other transactions instead of holding the bus in a wait state until the data is fetched. These new requirements, however, engender new technical problems that are yet to be solved.

One solution to these technical problems is to re-design the PCI host bridge (PHB) to accommodate the new requirements. A PHB is a hardware that interconnects a system bus to a PCI bus to receive/transmit input/output (I/O) data. The PHB accepts I/O commands from the system bus and controls the execution of these commands on the PCI bus. Conversely, the PHB accepts direct memory access (DMA) commands from the PCI bus and controls the execution of the DMA commands on the system bus. The PHB has an internal arbiter for controlling the PCI bus along interrupt support logic. The PHB contains data buffering for processor to I/O commands (i.e., loads, stores) along with data buffering and an internal data cache for DMA accesses to system memory.

SUMMARY OF THE INVENTION

A host bridge having a dataflow controller is provided. In a preferred embodiment, the host bridge contains a read command path which has a mechanism for requesting and receiving data from an upstream device. The host bridge also contains a write command path that has means for receiving data from a downstream device and for transmitting the received data to an upstream device. A target controller is used to receive the read and write commands from the downstream device and to steer the read command toward the read command path and the write command toward the write command path. A bus controller is also used to request control of an upstream bus before transmitting the request for data of the read command and transmitting the data of the write command.

BRIEF DESCRIPTION OF THE DRAWING

FIGS. 9A–9C are a pseudo code implementation of the tree-based LRU assignment algorithm.

FIGS. 10A–10C depict a latched dataflow used in the PHB of the present invention.

FIGS. 11A–C are a software implementation of the latched dataflow.

DESCRIPTION OF THE INVENTION

Figure 1:
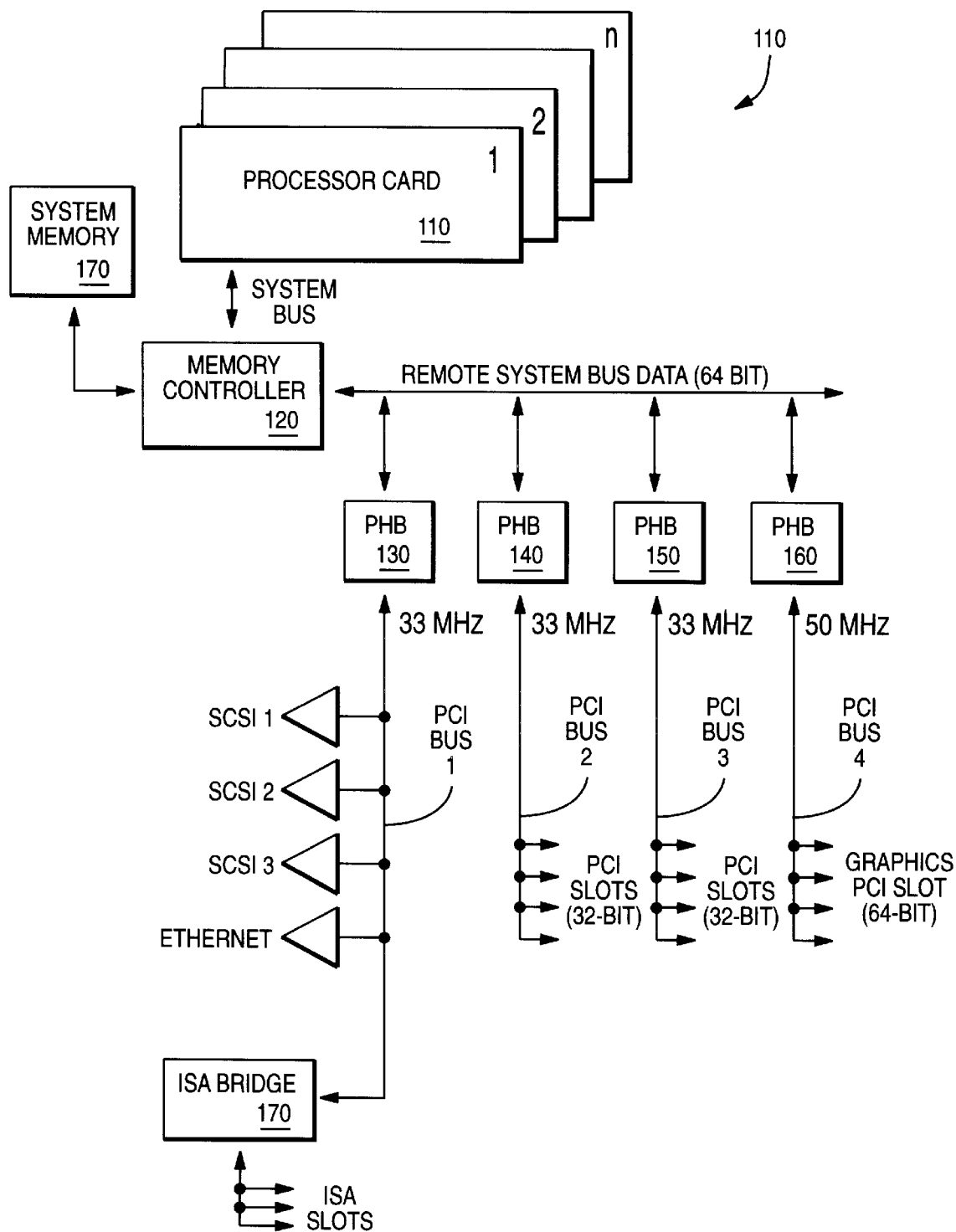
FIG. 1 is a block diagram of a computer system using the present invention.

FIG. 1 is a block diagram of a computer system 100 using the present invention. The computer system 100 may contain one to n processor cards 110 (n being a positive integer) connected to a memory controller 120 via a system bus. The memory controller 120 is further connected to PCI host bridges (PHB) 130, 140, 150 and 160 through a remote system bus. The memory controller is also connected to a system memory 170 through the memory bus.

Connected to PHB 130 via PCI bus 1 are small computer system interfaces (SCSI) 1, 2 and 3 as well as an ethernet adapter and an industry standard architecture (ISA) bus bridge 170. Three ISA devices may be plugged into the three ISA slots to become part of the computer system 100. An ISA device may be a keyboard, a mouse etc. Note that bus bridge 170 need not be necessarily an ISA bus bridge, it can be an extended industry standard architecture (EISA) bus bridge or a microchannel bus bridge. Furthermore, the ISA bus bridge 170 may be connected to any one of the PCI buses and not necessarily to PCI bus 1.

PCI devices such as audio adapter, local area network (LAN) adapter, printers etc. may be connected to the system 100 through the PCI slots of 33 Mhz PCI buses 2 and 3. The system 100 may also contain a graphics subsystem (i.e., a graphics adapter) connected to PHB 160 through 50 Mhz PCI bus 4.

When a PCI device wants to do a DMA read or write into system memory, it has to first request the use of the local PCI bus to which it is attached from the corresponding PHB. The PHBs arbitrate bus requests among those various devices. The PHBs also have to request the use of the remote system bus from the memory controller 120.

Figure 2:
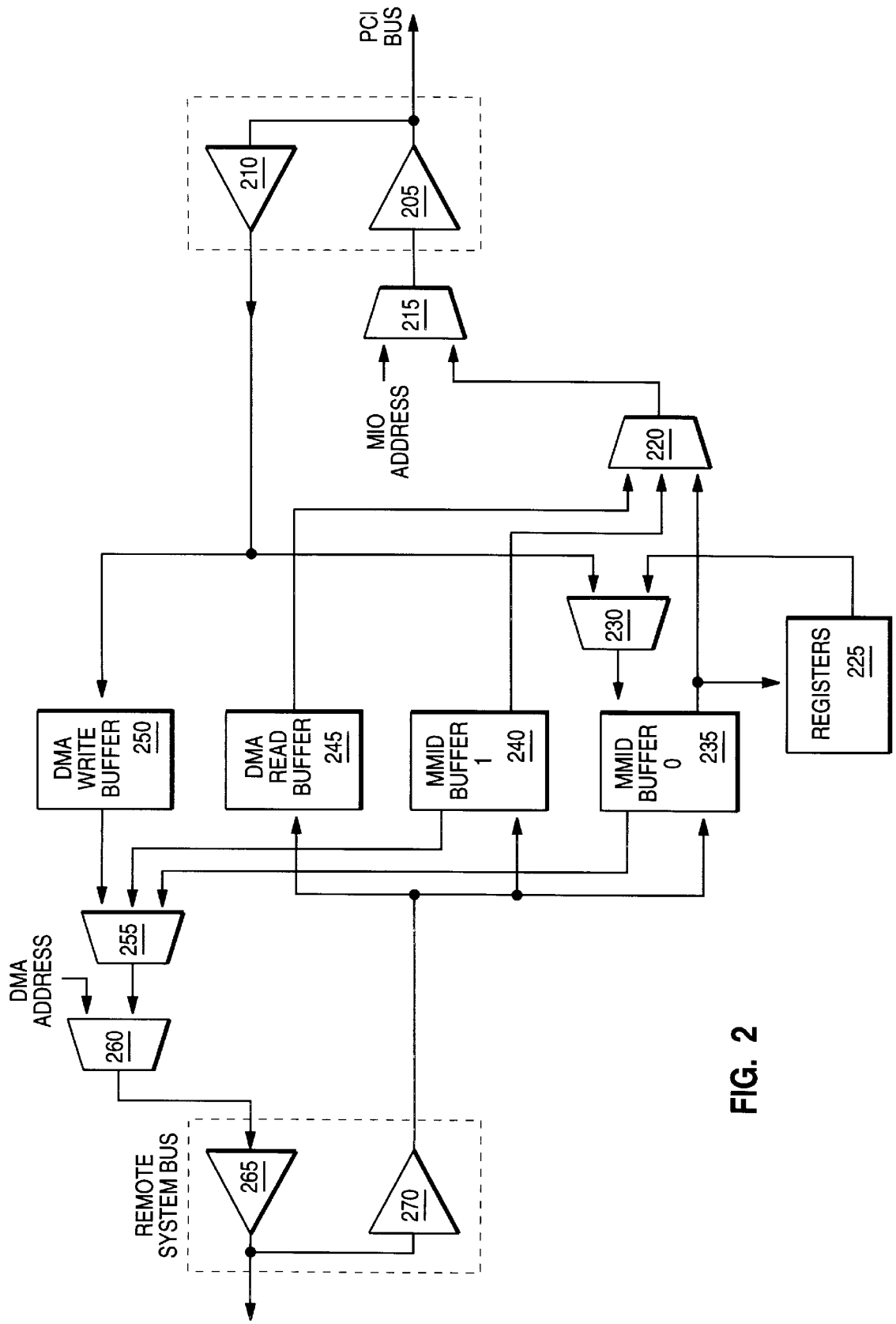
FIG. 2 is a block diagram of a data flow in a PHB of the present invention.
Figure 3:
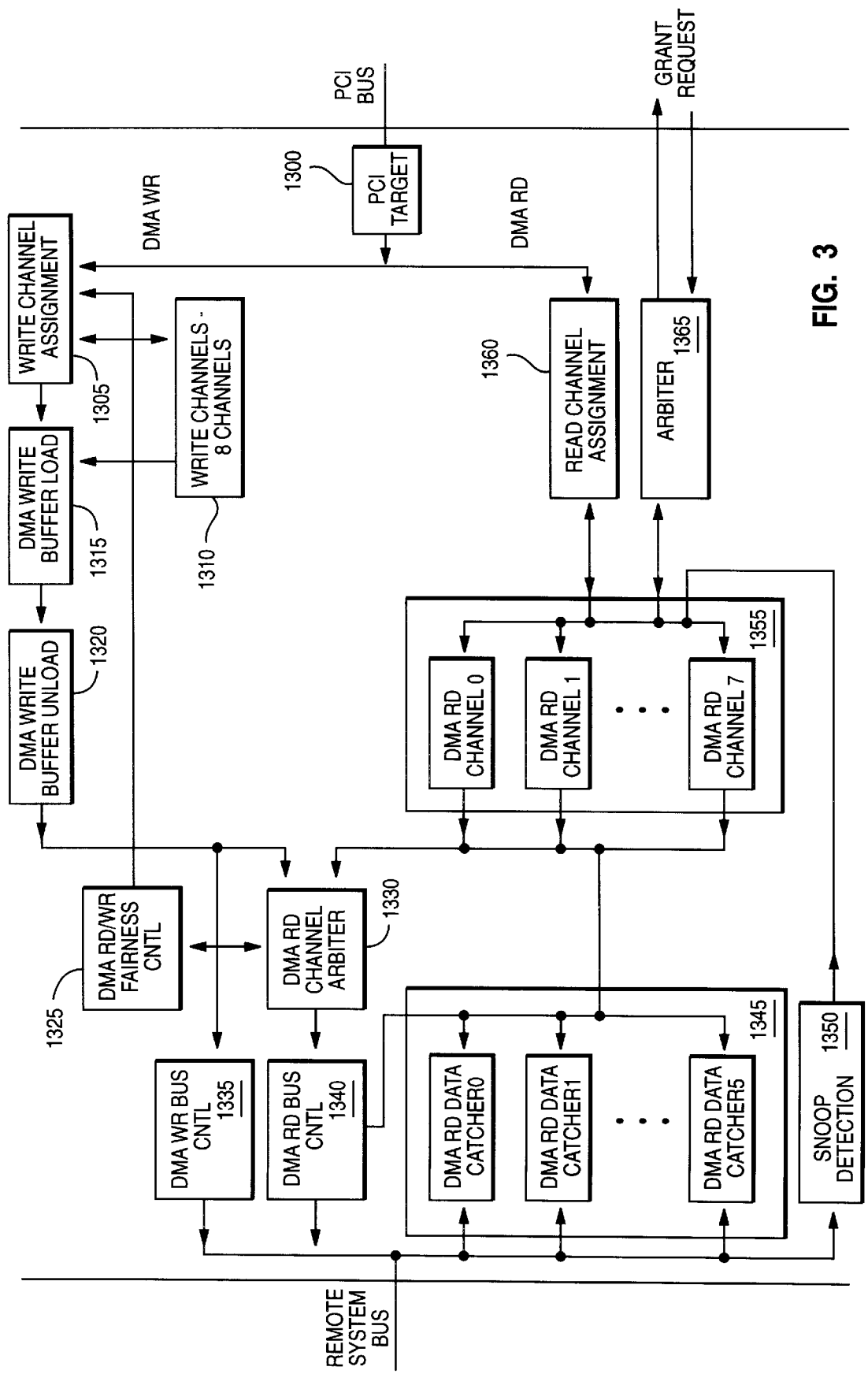
FIG. 3 is a block diagram of a control and address flow in a PHB of the present invention.

FIG. 2 is a block diagram of a DMA data flow in either one of the PHBs 130, 140, 150 and 160. When a PCI device is transferring data to the system memory 120, the data goes from tri-state buffer 210 into DMA write buffer 250. The data then continues through multiplexers 255 and 260 until it is put on the remote system bus by tri-state buffer 265. Data from the system memory 120 goes from tri-state buffer 270 to DMA read buffer 245 and through multiplexers 220 and 215 before reaching the local PCI bus via tri-state buffer 205. Data to and from a processor is put into either MMIO (memory mapped I/O) buffer 0 or 1 before on the remote system bus or the local PCI bus FIG. 3 is a block diagram of a DMA control and address flow, in either one of the PHBs 130, 140, 150 and 160. As can be seen, PCI target 1300 is connected to write and read channel assignments 1305 and 1360. The PCI target 1300 is a logic circuit that interprets the PCI protocol and decodes addresses and all signals associated with the PCI bus. The decoded address is either transferred to write channel assignment 1305, in the case of DMA write commands, or to the read channel assignment 1360 in the case of DMA read commands.

Figure 7A:
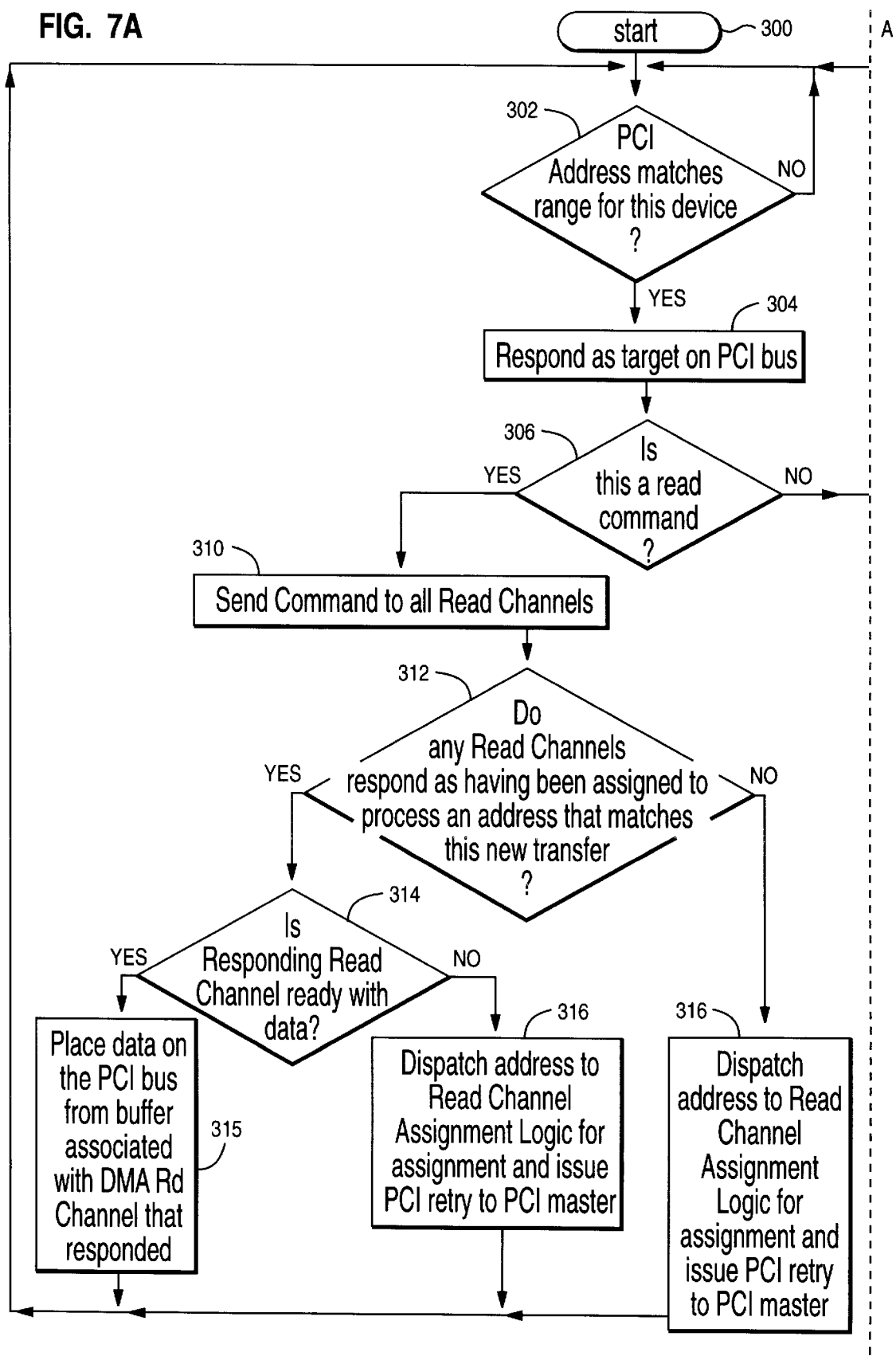
FIGS. 7A and 7B are a flow diagram of a PCI target dispatching read and write addresses.
Figure 7B:
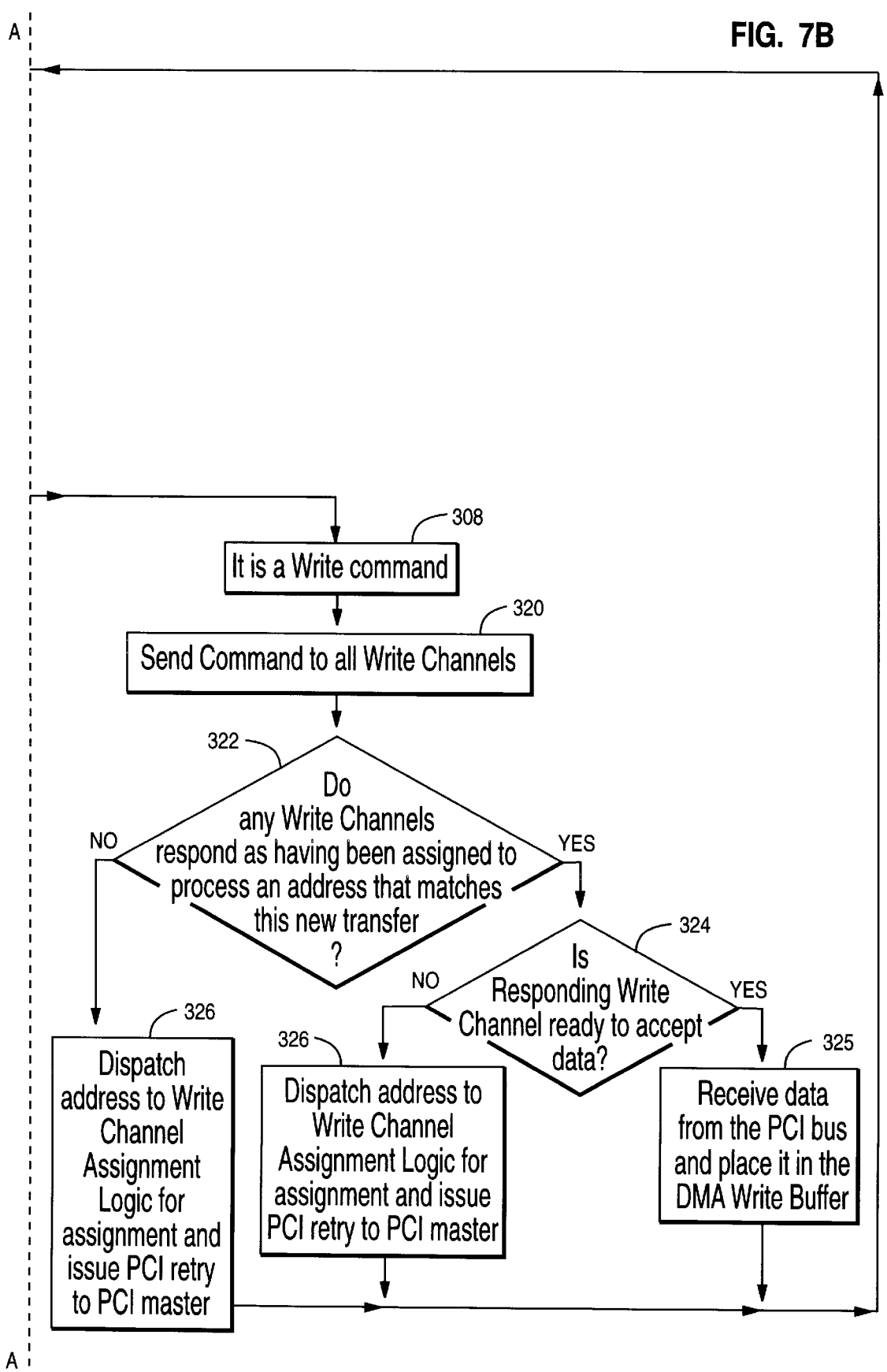

FIGS. 7A and 7B are a flow diagram of a PCI target 1300 dispatching read and write addresses. The PCI target 1300 receives an address at step 300. At step 302, it determines whether the address matches the address range of the PHB. If no, it return to step 300. If yes, the PHB responds as target on the PCI bus. Then, it is determined whether it is a read or write command. If it is a read command, the process goes to step 310. If it is a write command the process continues to step 308.

If it is a read command, the command is sent to the read channels 1355 (step 310). Then it is determined whether any of the read channels respond as having been assigned to process an address that matches this transfer address (step 312). If no, the address is dispatched to the read channel assignment 1360 for assignment and the process returns to step 300 (step 316). If yes, it is determined whether the responding read channel is ready with the data (step 314). If no, the process goes to step 316 and returns to step 300. If yes, the data is placed on the PCI bus (step 315)

If the command was a write command, the command is sent to the write channels 1310 (step 320). Then a determination is made as to whether any of the write channels responded as having been assigned to process an address that matches this transfer address (step 322). If no, the process continues to step 326 by dispatching the address to the write channel assignment 1305 and returns to step 300. If a channel responded as having been assigned the address, a determination is made as to whether the responding channel is ready to accept data (step 324). If no, the process continues to step 326 and returns to step 300. If yes, the write channel will begin to receive data from the PCI bus and to place the data in the DMA write buffer 250.

When the write channel assignment 1305 receives the address, it queries the eight write channels 1310 to determine whether the translation control element (TCE) for the new transaction is cached in any one of them. (A TCE translates a 4k PCI I/O page address into a system memory page address.) If none of the channels claim ownership of this 4K page, then the address is assigned to one of the channels according to the present state of each channel and a least most recently used (LRU) algorithm explained below.

The DMA write channels are assigned to fetch and cache the TCEs from the TCE table in system memory. The logic of the DMA write channels is referenced by the write channel assignment 1305 to determine the state of each channel. Each channel controls one TCE element, thus eight different DMA write streams can be managed at the same time. The channel that is assigned the queried address will pass the address to the DMA write buffer load 1315. Using this address, the DMA write buffer load 1315 will control the loading of the DMA write buffer 250 of FIG. 2. The DMA write buffer load 1315 will prematurely terminate loading of the write buffer 250 if the buffer becomes full before the end of the transaction. The PCI device will have to re-initiate the write request command. When the re-initiated write command is honored, it will start loading data at the point where the previous command had stopped.

The DMA write buffer unload 1320 controls the unloading of the buffer 250. The DMA write buffer unload 1320 can be unloading a previously loaded PCI transfer data stream from the DMA write buffer 250 while the DMA write buffer load 1315 is loading another DMA write transfer data stream into the buffer 250. Indeed, both the DMA write buffer load 1315 and the DMA write buffer unload 1320 are able to reference the same write channel (i.e., TCE) simultaneously. The DMA write buffer 250 can then be regarded as a write-through first-in first-out (FIFO) buffer that preserves the order of all DMA write data transfers.

The DMA write buffer unload 1320 is connected to both the DMA write bus control 1335 and the DMA read channel arbiter 1330. The DMA read channel arbiter 1330 arbitrates between the eight read channels 1355 and the DMA write buffer load 1315 when it is reading TCE data for the DMA write channels 1310 from the system memory 120. Control for the Data from the write buffer 250 to get on the system bus is sent to the DMA write bus control 1335 which makes sure that the bus is granted to the PHB before placing the data on the bus.

Similar to the DMA write channel assignment 1305, when the DMA read channel assignment 1360 receives the address from the PCI target 1300, it queries the eight read channels 1355 to determine which one is currently caching data at that address from the system memory 120. If no channel responds as having the address for the 4K page, the DMA read channel assignment 1360 assigns the address to one of the eight read channels. This channel then begins to fetch and cache data starting at that address. The decision regarding which channel to assign the address to is based on the state of each read channel and an LRU algorithm as will be further explained.

Depending on the number of DMA Read Request streams active at any given time, each one of the eight DMA read channels 1355 may be assigned to fetch and cache data. The data fetched by each of the read channels will come from a specific 4k memory page of the system memory 120. Thus, two channels will never both cache valid data for the same 4K I/O page as each channel manages only one TCE. In addition, each channel keeps track of a re-assignment state used by the DMA read channel reassignment 1360 to determine which channel to assign the address of the next requested data. Using the snoop detection 1350, each channel snoops DMA write transfers and the remote system bus traffic to invalidate its data when the data is modified by another device. Hence, as the channels work independently from each other, the PHB can manage up to eight different PCI DMA Read data streams at the same time.

Once a read channel is given permission to access the system bus by the DMA read channel arbiter 1330, the address is passed to the DMA read bus control 1340. The DMA read bus control 1340 issues the address to the bus and assigns a bus tag used with the read address to a DMA read catcher from the six DMA read catchers 1345. By having six DMA read catchers 1345, the PHB may have six DMA read transactions in process (i.e., address issued, data return pending) at any given time. As is obvious, therefore, this architecture is designed to pipeline several DMA read transactions to counteract the latency that is usually associated with reading data from the system memory.

Figure 6:
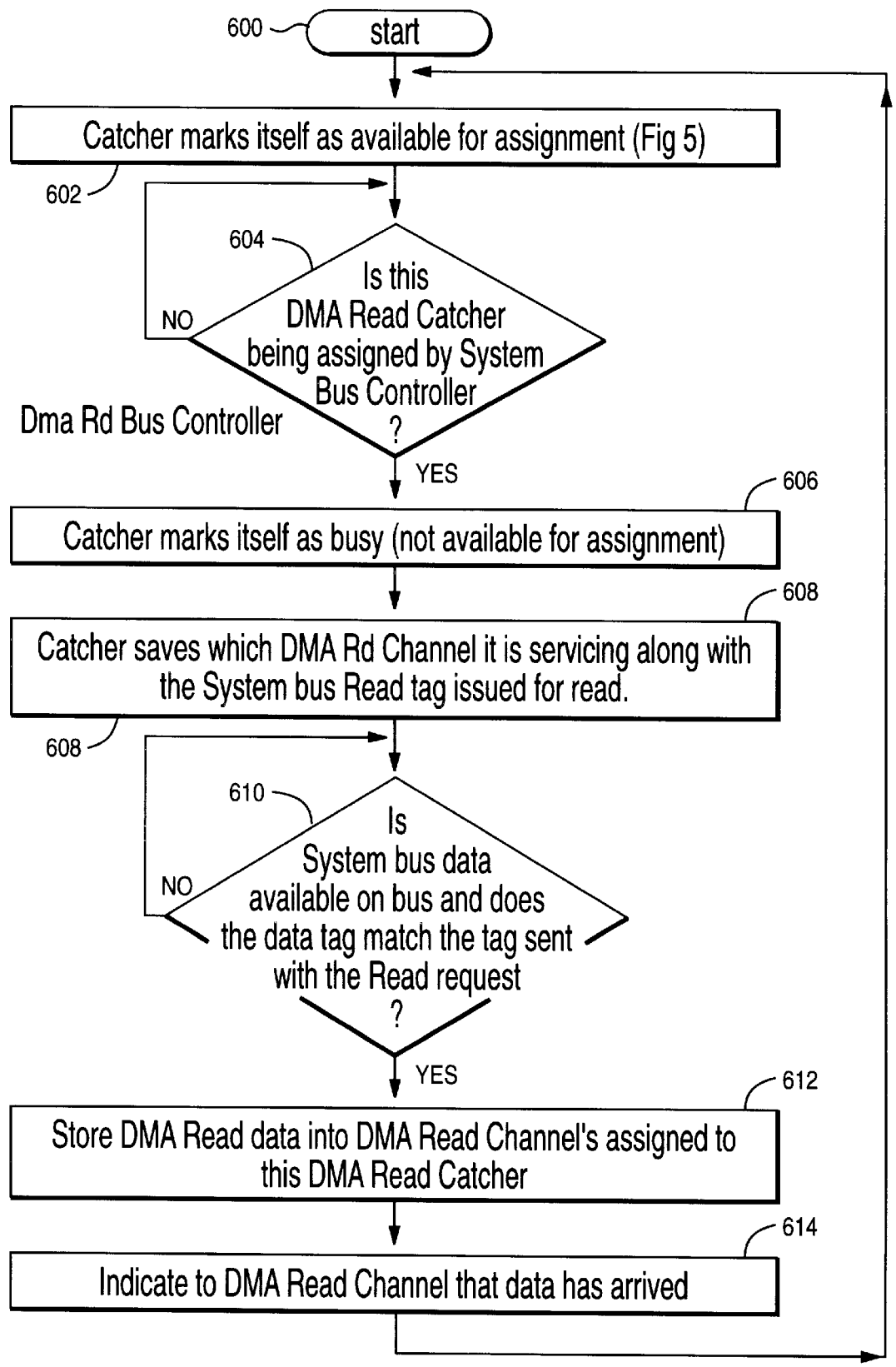
FIG. 6 is a flow diagram of a read data catcher.

FIG. 6 is a flow diagram of the read data catcher 1345. The process starts at step 600. At step 602, one of the DMA read data catchers marks itself as being available for assignment. At step 604, it is determined whether the DMA read catcher is being assigned by the DMA Read Bus Controller 1340. If not, the process returns to 602 to for the DMA read catcher to continue be available for assignment. If yes, the DMA read catcher marks itself as being busy (step 606). At step 608, the DMA read catcher stores the DMA read channel it is being serviced along with the system bus read tag issued for the read. At step 610, it is determined whether the data is available on the system bus and whether the data tag matches the tag sent with the read request. If no, the process returns to step 608. If yes, the process continues to step 612 where the data is stored into the DMA Read buffer 245. At step 614, the DMA read data catcher notifies the DMA read channel that it is servicing that the data has arrived.

The ordering rules for DMA traffic is as follows: (1) a DMA write request must NOT pass a previous DMA write request, (2) a DMA read request must NOT pass a previous DMA write request, (3) a DMA write request may pass a previous DMA read request and (4) a DMA read request may pass a previous DMA read request. Accordingly, therefore, (1) and (2) are the only rules that must stay strictly ordered. By using the write buffer 250 as a write-through FIFO buffer, the DMA write buffer load 1315 and the DMA write buffer unload 1320 ascertain that rule 1 is adhered to. Rules 2 and 3 are managed by the DMA read/write fairness control 1325. The multiple read channels 1355 allow the PHB to maximize the performance of rule 4 by allowing the read channels 1355 to run independently of each other.

Arbitration control for the DMA write and read channels has a special control to maintain proper order of execution while maintaining fairness across the write and read channels. This is handled with a multi-tier arbitration scheme. The arbitration scheme is as follows: (1) DMA reads vs. DMA writes; (2) read requests from DMA read channels vs. DMA write channels and (3) read priority between the eight read channels.

Thus, between DMA write requests and DMA read requests:

(a) a request from DMA write bus controller 1335 (e.g., a DMA write) has higher priority than a request from DMA read controller 1340 (e.g., a DMA read);

(b) when the DMA write bus controller 1335 detects a second DMA write request from the DMA write buffer unload 1320, it does not allow the DMA read bus controller 1340 to issue a DMA read request onto the remote system bus;

(c) if the DMA read bus controller 1340 is being retried, the DMA write bus controller operation may take priority and be issued before the DMA read bus controller operation.

As mentioned before, the rules for maintaining proper order and fairness between read and write channels are implemented within the DMA read/write fairness control 1325. A DMA write channel request to read a TCE has first priority. Requests from the eight DMA read channels to read TCEs or data have second priority. Therefore, when there is a long continuous stream of DMA write transfers onto the remote system bus, DMA read requests may be precluded from using the system bus for a long period of time. To circumvent this occurrence, therefore, the DMA read/write fairness control 1325 only allows eight consecutive write requests to be accepted while a DMA read channel is requesting the use of the system bus. Although in this case eight consecutive write requests are allowed to be serviced, it should be understood that depending on the design any other number may be allowed to be serviced consecutively. Once the eight write requests have been honored, the DMA read/write fairness control 1325 informs the DMA write buffer load 1315 to stop accepting any new DMA write transactions so that the read channels can be serviced. When the DMA write buffer 250 has emptied its current DMA write data, the DMA read/write fairness control 1325 then allows the DMA write buffer load 1315 to start accepting new write transactions.

Requests from the eight read channels are accepted on a round robin scheme. For example, if a read request from DMA read channel 4 (DRC4) had just been accepted by the DMA read bus control 1340, then the DMA read channel arbiter 1330 would assign the following priority to the channels:

DRC5>DRC6>DRC7>DRC0>DRC1>DRC2>DRC3>DRC4

Figure 4:
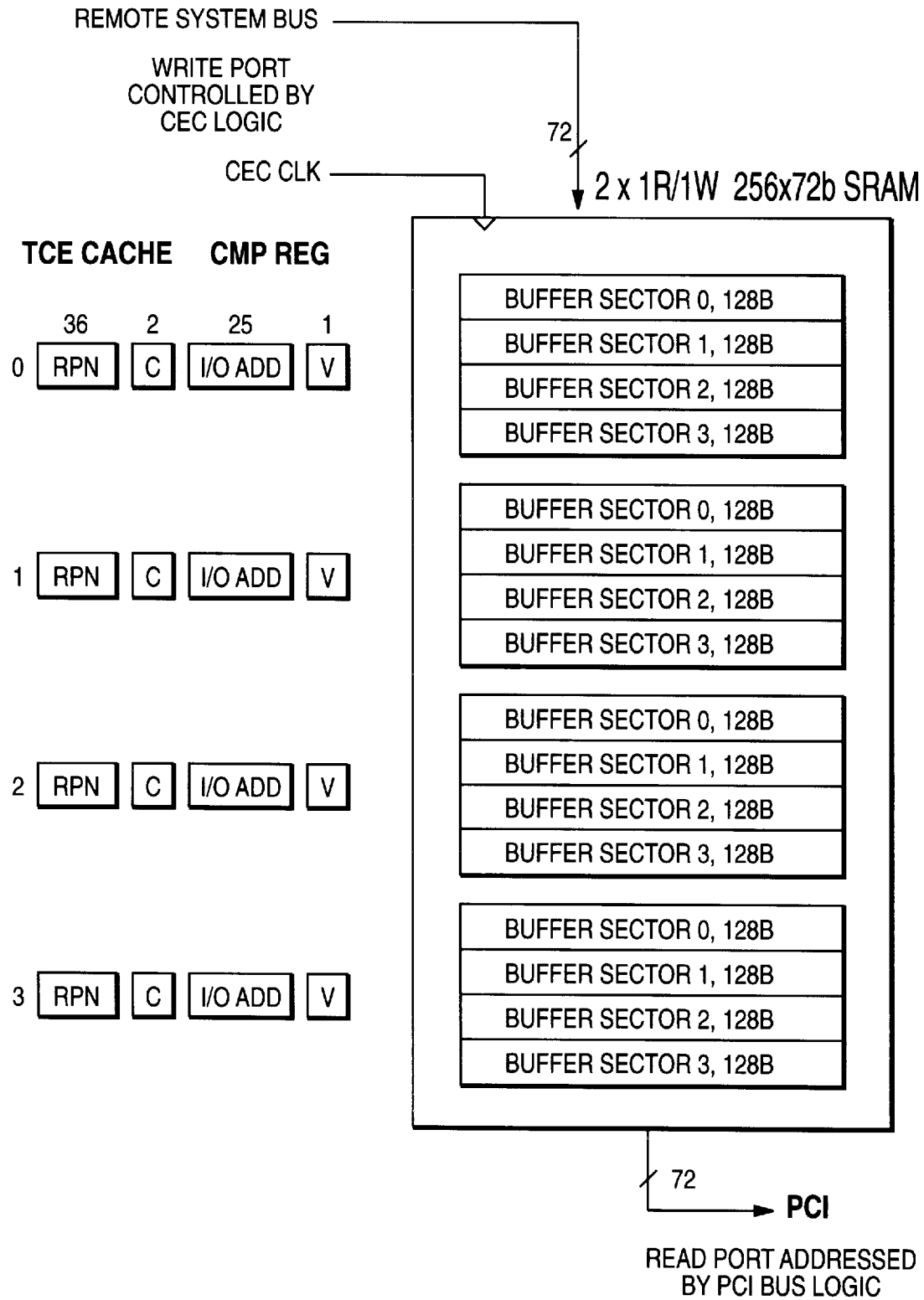
FIG. 4 depicts a block diagram of a multi-channel structure of a DMA read data buffer.

Returning to FIG. 2, DMA write buffer 250 and DMA read buffer 245 can store 256 bytes and 2 kilobytes of data, respectively. They are further subdivided into a multi-channel structure where each channel can independently process a DMA transfer. FIG. 4 is a block diagram of the multi-channel structure of DMA read data buffer 245. The DMA read buffer 245 can be programmed to run in one of two modes. The first mode is an eight independent channel buffer mode capable of storing 256 bytes of data each. Each channel buffer is partitioned into four 64 bytes buffer sectors with one TCE register associated with each channel buffer. The second mode is a four independent channel buffer mode capable of storing 512 bytes of data. Each channel buffer is partitioned into four 128 bytes buffer sectors with one TCE register associated with each channel. Shown in FIG. 4 is the DMA read buffer 245 being run in the four independent channel buffer mode. This mode is intended to work in a system environment that may perform better with deeper data buffering across fewer channels.

When a PCI device initiates a PCI read transfer to the system memory 120, the PHB to which it is connected allocates one of the channels to service the transfer. The four buffer sectors of that channel are managed such that transfers between the system memory 120 and a buffer sector is overlapped with read requests from the other sectors. Thus, the channel buffer operates like a quad sector ring buffer. When the DMA read buffer 245 is operating in the eight independent channel buffer mode, the PHB can accept up to eight PCI read request addresses, one for each channel, even before it has delivered any data. Once a channel has been assigned an address, it initiates a request on the remote system bus to fetch the data. Each of the eight channels may be actively attempting to issue a read request on the remote system bus at the same time. Upon having a sector filled with data, the channel will start delivering the data if the read channel assignment 1360 requests a reading from that address. Once a particular channel has made forward progress by delivering data, it may be reassigned based on the LRU algorithm mentioned earlier. Note that since the DMA read buffer 245 is solely used for DMA reads, the data in the caches is never "dirty". Note also that all channels are set to zero at power on.

The TCE registers are of 64 bits each. The first 36 bits contain the address of the real memory page number (RPN). The next two bits show the control status c. The following 25 bits contain the I/O address. This address is used to fetch the TCE address. The last bit is a snoop bit v. As shown in FIG. 4, a TCE cache register is maintained for each DMA read channel when the TCE mode is enabled. The cached TCE entry determines the RPN to which all four sectors of the corresponding channel are mapped in system memory.

When a bus master (e.g., a PCI device) requests a read from system memory, the PHB will acknowledge the transaction with a device select signal (DEVSEL__). Then, the PHB will check for a valid TCE, fetch a new TCE if necessary and perform one or four buffer sector read requests if the data is not already in the DMA read buffer 245. Three different PCI read commands are used by the PHB to determine how many buffer sectors to fetch: memory read, memory read line and memory read multiple.

The memory read multiple command from a PCI bus master device causes the PHB to fetch all four sectors of a channel (i.e., the sector addressed by the bus master and the next three sectors). The DMA read channel will retry the bus master until the first sector has been fetched. If the bus master is in the midst of a burst transaction, the request can be serviced without delay (i.e. TRDY will continue to be asserted). Once the bus master has crossed over from the first buffer sector into the second, the first sector will be re-loaded with the next sequential sector (i.e., a fifth sector). When a DMA device approaches the end of the 4K page, the PHB will stop pre-fetching at the 4k page boundary. Upon detecting that a PCI device has read the last sector of the 4k page, the PHB will invalidate the channel thereby allowing it to be re-assigned.

The memory read and the memory read line commands from a PCI bus master cause the PHB to fetch only one sector. A read channel will retry the bus master until the first sector has been fetched. Again, if the bus master is doing a burst transaction, the request will be serviced without delay until the end of the sector. If the bus master requests to read at an address that is in a different buffer sector (e.g., the address references the next sector), the PHB will initiate a request for the new sector and retry the PCI master until the data has been fetched from system memory. If the remote system bus latency is such that the read channel cannot continue to provide read data after the start of data delivery, the PHB will do a target disconnect at the sector boundary and continue to pre-fetch data to fill its cache. If the PCI bus master starts a new transaction at the next sequential address, then the PHB will start to deliver the read data from its cache. If the new address is not within the sector, then the read channel will retry the transfer (i.e., will do a delayed read transaction) until the requested data is fetched. Note that the PHB can pipeline up to six read requests from system memory and each read channel can issue up to four reads (one for each buffer sector).

Figure 5:
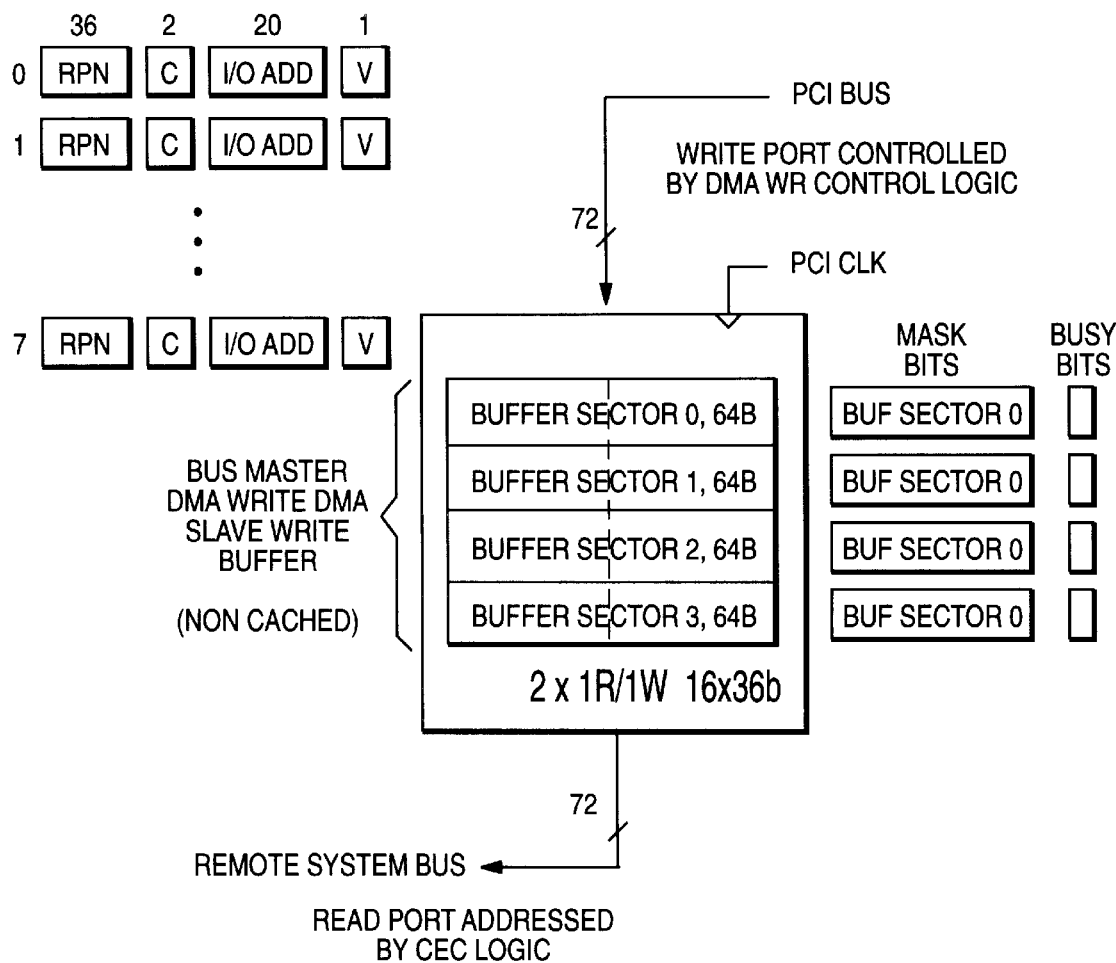
FIG. 5 depicts a block diagram of a multi-channel structure of a DMA write data buffer.

FIG. 5 is a block diagram of the multi-channel structure of DMA write data buffer 250. The PHB implements one set of DMA write buffers which accommodate four buffer sectors (each sector is of 64 bytes). All DMA write data is routed through this buffer. (Note that it is referred to as a buffer and not as a cache because dirty data is always written into memory as soon as a DMA device moves from one sector to the next or when the device relinquishes the PCI bus.) The four sectors in the buffer are managed such that transfers between one sector and system memory can occur at the same time as the PCI bus writes to any of the other three sectors. Thus, just like the DMA read buffer 245, the DMA write buffer 250 operates as a quad sector ring buffer.

An eight entry TCE cache is maintained for bus master DMA write transfers. During a DMA write operation, one of the eight cached TCEs will be used to determine the RPN to which all four sectors of the DMA write buffer set are mapped. For example, when a bus master requests a write to memory, the PHB will compare the PCI address to the I/O address registers associated with each of the TCEs. If that comparison is false, the required TCE will be loaded from system memory using a similar LRU algorithm to the one used for the read channels. Once a TCE is fetched (or if the valid TCE is already cached), the DMA write buffer load 1315 will begin storing the data into the DMA write buffer 250 starting at the sector referenced by the TCE. Once the sector is filled, data will begin to flow to the next sector, at that time then, the data in the first sector can be written into system memory.

The PHB implements a set of mask bits which indicates which parts of the DMA write buffer 250 contain data. One mask bit is set for each byte of data written into the buffer. The mask bits are addressed in the same manner as the buffer itself is addressed. Once a sector is filled and data begins to flow to the next sector or when control of the bus is relinquished, the mask bits are examined to determine how many bytes within a particular cache line have to be written to memory. When the data in a buffer sector is written into system memory, all mask bits associated with that sector are reset.

When a device initiates a data burst that starts in the middle of a sector, data will be written in the buffer starting at that point. If the data burst fills up the initial sector and starts to fill the next sector, at that time the initial sector will be marked as busy indicating that it is ready to be flushed to system memory. This allows the DMA write buffer logic to store only the initial address of a data burst and the number of sectors associated with that burst, the mask bits indicating the valid bytes in a sector.

The PHB may be put into a mode where it will combine DMA writes into 128-byte block writes whenever possible. In this mode, the PHB will attempt to wait for two 64-byte sectors to fill up before issuing the DMA write on the remote system bus. The PHB will only combine two 64-byte buffers when all 128 bytes have valid data and the 128-byte block starts on a 128-byte address boundary. Once the transfer has terminated, the buffer is flushed to remove remaining data for that write access.

When a PCI device relinquishes the PCI bus after performing a DMA write, the PHB will flush to memory the last sector that was written. If some of the bytes in the sector have not been written, the PHB will perform a sequence of writes so that only the valid data is written into memory. This prevents the need of performing a "read-modify-write" sequence. Thus, the DMA write buffer 250 may be viewed as a simple time delay I/O buffer. Note that the PHB never assumes ownership of the data in this buffer so no snooping is needed.

As mentioned before, the PHB employs a least recently used (LRU) algorithm for selecting a read channel for re-assignment. The selection is based on the present state of each of the read channels. The states are as follows:

State 1: a channel is not currently assigned an address. This state is entered into when:
  i. coming out of reset;
  ii. the channel has been marked invalid due to a snoop hit; or
  iii. the channel issues a target abort due to an error fetching a TCE or data.

State 2: a channel has made forward progress and the PCI command was a "Memory Read" or a "Memory Read Line". This state is entered into when:
  i. the channel delivers at least one byte of data to the PCI device.

State 3: a channel has made forward progress and the PCI command was a "Memory Read Multiple". This state is entered into when:

i. the channel delivers at least one byte of data to the PCI device.

State 4: a channel has not made forward progress. This state is entered into when:

i. the channel has been re-assigned and is in the process of fetching a TCE and enough data to start the PCI transfer. Once the DMA read channel is ready and the PCI master returns a matching read address, this DMA channel will transition from state 4 to either state 2 or 3. If the PHB retries the operation and the PCI master never returns with a matching address, the PHB will expire the operation (based on time-out value on the order of $2^{21}$ PCI clock cycles). This serves as a protection against having the PHB remained in a "no forward progress state"; or ii. the channel has been configured to be disabled.

Note that the LRU will mark a channel as most recently accessed even if the address is retried.

The following pseudo-code determines which DMA read channel is assigned to a new PCI transaction:

If any of the read channels are in state 1 then assign one of the channels in state 1 based on a priority where channel 0 is highest and channel 7 is lowest;
else if any of the read channels are in state 2 then
    assign one of the channels in state 2 based on an LRU type algorithm which takes the least most recently used read channel from the list of state 2 channels;
else if any of the read channels are in state 3 then
    assign one of the channels in state 3 based on an LRU type algorithm which takes the least most recently used read channel from the list of state 3 channels;
else
    all channels are in state 4 (no DMA will be assigned to this new PCI read address).

Similarly, the PHB employs an LRU algorithm for selecting a write channel for re-assignment. The algorithm is the same as that of the read channels with the exception of the state 2. The write channel algorithm does not have a state 2 because all writes are treated equal.

The following pseudo-code determines which DMA write channel is assigned to a new PCI transaction:

If any of the write channels are in state 1
then
    assign one of the channels in state 1 based on a priority where channel 0 is highest and channel 7 is lowest;
else if any of the read channels are in state 3 then
    assign one of the channels in state 3 based on an LRU type algorithm which takes the least most recently used channel from the list of state 3 channels;
else
    all channels are in state 4 (no DMA will be assigned to this new PCI write transaction)

Returning to FIG. 3, the DMA read channels 1355 uses PCI arbiter 1365 to increase arbitration efficiency when doing PCI posted memory reads. For example, when a PCI device requests data from the system memory 120, until the data is available in the DMA read buffer 245, the PCI device will continually request the data from the PHB. This constant use of the PCI bus fosters inefficient traffic on the bus. In this embodiment, the PCI arbiter 1365, in addition to performing the duty of an ordinary PCI arbiter, provides an indication of the state of the read channels 1355.

In particular, when a DMA read channel is assigned the task of fetching data, in addition to the normal address/command information, it is also informed by the PCI arbiter of which PCI device was granted the PCI bus (i.e., PCI Req/Gnt pair 3). Upon being assigned the address, a DMA channel will inform the PCI arbiter 1365 for which of the PCI devices it is presently fetching data by asserting a signal. The arbiter 1365 uses this information to mask further requests for the data from that PCI device. When the read channel is ready to transfer the requested data to the PCI device, it deactivates the signal. The arbiter 1365 then unmasks the requests from the PCI device and provides high priority of the PCI bus grant to that PCI device. The following algorithm may be used to implement the use of the arbiter to increase PCI bus efficiency:

1. PCI device A does an initial attempt at a DMA read from system memory;
2. the PHB retries device A and masks device A's request line off internally (i.e., blocking device A from gaining control of the bus until the DMA read data is available);
3. device A requests the PCI bus to retry the operation, but since its request is blocked, the arbiter does not get the request; meanwhile the PHB is fetching the data from system memory;
4. the data is placed in the DMA read buffer 245 and the mask is removed from device A's request line; and
5. the arbiter 1355 grants the bus to device A to receive the requested data.

As is obvious, the PHB has the ability to fetch and cache data and TCEs. In order to do so and maintain coherency, the DMA read and write channels must snoop traffic from both the PCI bus and the remote system bus. Below is a description of the rules used to maintain coherency.

Read Data Cache Rules

The MESI protocol defines that a cache line can be in 1 of 4 states (Modified, Exclusive, Shared, or Invalid). The modified state indicates that an addressed block of data is valid only in the cache having the modified block and the modified data has not been written back into the system memory. The exclusive state indicates the data is present only in the noted block and is consistent with system memory. If a block of data is shared, it is valid in more than one cache and is consistent with system memory. When a block is invalid, it is not resident in that cache.

In order to streamline the design, the PHB only maintains data in either the Shared state or the Invalid state (i.e., will never hold data in the Modified or Exclusive state). This greatly simplifies the cache control logic needed in the Host Bridge. Consequently, only one bit is used to represent the state of the TCE and the data. In this case, if either the TCE or the Data took a hit in the snoop logic, then everything would be assumed invalid by resetting the bit. A tradeoff can be made as to whether the PHB contains two bits to represent the state of the data: one for the TCE cached and the other for the data cached. Two bits would provide better efficiency when data hits were detected at the expense of additional logic and complexity.

For ease of implementation, the PHB is designed to have only one of the 8 DMA read channels 1355 contained valid data for a particular 4K I/O page. This eliminates contention problems usually associated with two or more DMA channels responding to requests for data they thought they both had.

As mentioned before, the DMA read buffers 1355 have each four buffer sectors. For ease of implementation, only the address associated with the buffer sector at the head of the queue is used in the comparison with the PCI transaction when determining if the data has been hit. The other three buffer sectors serve as prefetch buffers which are available to sustain the burst of data for as long as the PCI master desires. This structure matches with typical I/O traffic which consists of large contiguous block transfers that may be broken up across several different PCI burst accesses mixed with small transfers that jump around in system memory.

TCE Cache Rules

Every TCE in the PHB TCE cache is unique. This means that for every 4K PCI I/O address that the PHB responds to as a target, there exists a unique TCE entry in the TCE table. No two DMA read channels, in the PHB, will be assigned to process the same unique TCE (i.e., same 4K PCI I/O page.). The RPN values stored in each TCE may not be unique. This means that even though no two Read Channels will ever be using the same TCE, it is possible that RPNs for different channels may point to the same real page in system memory.

When a new DMA read/write TCE is loaded and the RPN hits a valid read/write channel RPN cached within the PHB, then the read/write channel TCE will be marked as having a 'delayed hit' (i.e., to be invalidated once forward progress has been made). Once the read/write channel has made forward progress (i.e., PCI data delivered in the case of a read channel or PCI data is accepted in the case of a write channel) and is not active in a PCI transfer, it will be marked as invalid. If the read/write channel has already made forward progress and is currently not active in a PCI transfer when the snoop hit occurs, then the 'delayed hit' condition takes effect immediately to invalidate the TCE.

The PHB is not required to guarantee the consistency of its cached TCE entries if a DMA write is performed to any part of the system memory which contains all or part of the TCE table. If this type of transfer is attempted, it is the responsibility of the software to manage the potential inconsistency. This means the TCE caches in the DMA write or read channels need not snoop DMA write traffic.

PHB Snooping Rules

All cached TCEs fetched from the TCE table will be snooped to the 4K page level on 'Page Kill' operations and snooped to the 128 byte level for all other global system bus operations. The snooping of any given cached TCE starts when the PHB's request for a TCE from memory is on the remote system bus (before the TCE data is actually received).

All four sectors in any valid DMA read cache will be associatively snooped to the 4K page level. The PHB will compare the RPN of the cached read TCE's to the snoop address from the system bus to determine whether a hit has occurred on one of the read data caches. This DMA read data cache snooping begins as soon as the TCE data is received from memory. The DMA write buffer will not be snooped since write data is not cached.

PHB Coherency States

Each channel must track the coherency state of the data and TCE it has cached. In order to do so, each channel maintains two latches: a VALID latch, and a DELAY-HIT latch. The VALID latch is used to indicate the state of the TCE/DATA. The DELAY_HIT latch serves as a DKILL queue for this channel to log whether the data in the channel needs to be invalidated. When the DELAY_HIT latch gets set, there may be a delay before the channel can actually invalidate its data (i.e., set VALID latch set back to 0) so that data thrashing which could lead to livelock/deadlock conditions can be avoided. Below are the conditions for what sets and resets the VALID and DELAYED_HIT latches:

READ Channel:

VALID latch is set when:

1) RPN data received (i.e., TCE data fetched is complete).

VALID latch is reset when all of the following cases below are true:

1) Channel has made forward progress (i.e., at least one byte of data has been delivered to the PCI master);
2) Channel is not still waiting on any prefetch data;
3) DELAYED_HIT latch is set; and
4) Channel is currently not involved in PCI transfer DELAYED_HIT latch is set when any one of the following cases are true:

1) snoop hit on TCE after TCE address has been issued but before TCE data has returned;
2) snoop hit on TCE or DATA when VALID latch is set to 1;
3) the new RPN fetched for this read channel matches a Write Channels Valid RPN;
4) a new RPN fetched by a write channel matches the RPN currently valid for this read channel;
5) when this read channel has detected that the last buffer sector for this 4K page has been delivered to the PCI master; or
6) when an error has occurred while fetching data/TCE for this channel.

DELAYED_HIT latch is reset when:

1) same conditions that reset the VALID latch.

WRITE Channel:

VALID latch is set when:

1) RPN data received (i.e., TCE data fetch completes).

VALID latch is reset when all of the following cases are true:

1) Channel has made forward progress (i.e., at least one byte of data has been received from the PCI master);
2) DELAYED_HIT bit is set; and
3) Channel is currently not involved in PCI transfer.

DELAYED_HIT latch is set when any of the following cases are true:

1) snoop hit on TCE after TCE address has been issued but before TCE data has returned;
2) snoop hit on TCE when VALID latch is set to 1;
3) a new RPN fetched by a read channel matches the RPN currently valid for this write channel; or
4) when an error has occurred while fetching TCE for this channel.

DELAYED_HIT latch is reset when:

1) same conditions that reset the VALID latch.

Because the read channels snoop data on a 4K page boundary (as opposed to snooping on a cache line boundary), special considerations must be made to still maintain coherency. The Read channel monitors the write channels activity not on a cache line basis, but rather at the 4K page basis. This simplifies the task by the read and write channels because now they only need to compare their current page (i.e., RPN) against any new TCE data (i.e., RPN) as it arrives from the TCE read (as opposed to checking data "real time" on a cache line basis as it is being transferred). The way this is done, as seen in the rules above, the read channel must detect whenever a PCI device is writing (i.e., modifying) data that is within the 4K page it is caching. Instead of watching for when the data is actually written, the read channel watches for when any write channel fetches a new TCE. The read channel can then check the new RPN being fetched by the write channel to detect if the write is within the same page. A similar check is done by the write channels whenever they detect a read channel has fetched a new TCE (i.e., TPN). This is necessary in order to trigger the write channel to refetch a TCE (RPN data) so the read channel can again be able to detect whether a write channel has started after the read channel started caching data.

Rule 4 under read Channel DELAYED_HIT set is used to properly the out of order sequence that can occur when a new channel is guaranteed to make forward progress before a DELAYED_HIT has actually invalidated the channel. For instance, the Write Channel may fetch its TCE first followed by a Read channel's TCE fetch for the same page (the Write Channel would set its DELAY_HIT) latch when it detects the Read Channel RPN matching its own) but, because the PHB has retried both PCI masters, the Read channel may deliver data before the write data is delivered, leaving the Read channel with stale data. The rule then adds the condition for the Read Channel to set its own DELAY_HIT latch when it receives its RPN for the TCE fetched and one of the write channels detects its RPN matches that of the read channel.

LRU Algorithm for DMA Channel Assignment in a PCI Host Bridge

Within the DMA Read Assignment and DMA Write Assignment portions of the PHB is an LRU-type assignment arbiter. The arbiter is based on an LRU assignment algorithm used in 8 way set associative L2 type cache controllers to determine which of the 8 segments in the cache is the oldest. This implementation has been adapted to an arbiter type environment where the number of available selection is dynamic (i.e, a function of the number of channels currently available for assignment whereas with an 8-way set associative cache, the number is always static at 8).

Figure 8:
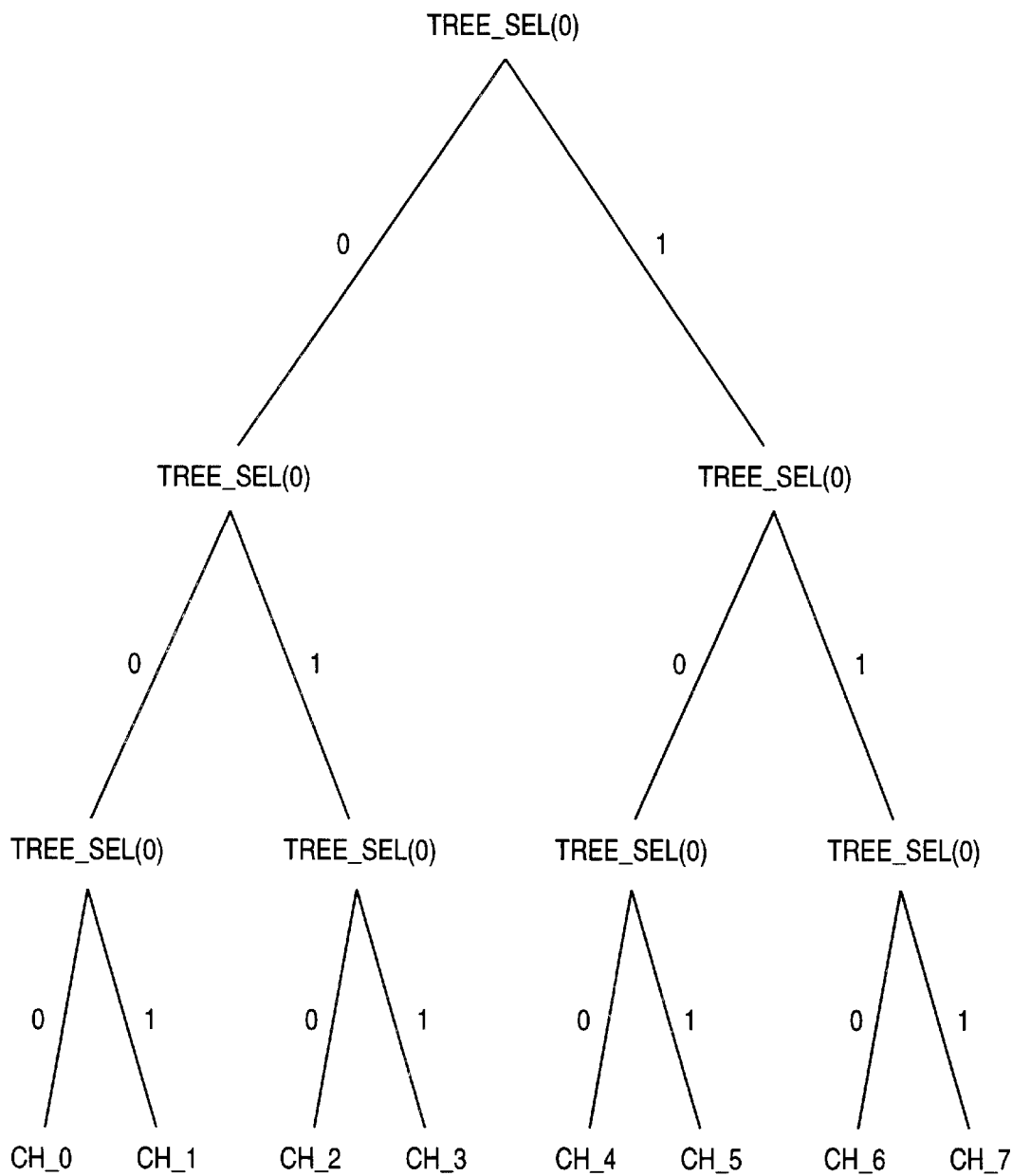
FIG. 8 depicts a tree-based LRU assignment algorithm.

In this description the number of DMA channels is eight. The selection of which of the 8 channels to assign is done using a tree-based LRU assignment algorithm which is tailored to use minimal hardware. The register TREE_SEL_REG has a bit combination that will uniquely point at a node (i.e., selected device) in the tree. Each node, when it is selected, forces the bit pattern to point away from the limb selection in the tree that points to that node (i.e., making itself the Most Recently Used node). The output selection of the tree is then selectively steered to only those legs that can be legally selected (i.e., available for reassignment). The output of this modified LRU selection is then used to indicate which channel has been assigned. See FIG. 8 for a depiction of the tree-based LRU algorithm and FIG. 9 for a pseudo code of the implementation.

Note that the tree-base LRU-type structure is not a true LRU but instead has been modified to minimize the logic required (a true LRU would require much more logic). This solution, although not an exact LRU, comes very close to the accuracy that one would get with a true LRU implementation.

Dynamic Disable of Load Data Ordering Within a PCI Host Bridge

Data from a processor load (i.e., Delayed Read Completion data) must not bypass DMA write data (e.g., the DMA write data must flush to system memory before the Load Data can be delivered). The purpose of this rule is to provide a mechanism for the processor to synchronize interrupts it receives with DMA write data. This is necessary because the PCI allows interrupts to bypass DMA write data.

The PHB handles this constraint by having the master controller take a snapshot of the state of the four buffer sectors in the DMA write buffer. This snapshot is taken whenever the PHB master control logic has just received load data off the PCI bus. The master controller will wait until the DMA write buffer sectors have been emptied. At this point, the master controller knows the write data that arrived prior to its Load data has been flushed so it can deliver its Load data to the processor. Because the DMA write buffer is a write-through buffer, the PHB master controller logic that performs the snapshot is strictly passive in that the DMA write buffer is unaffected when the master control logic is waiting for certain buffer sectors to empty.

The PHB's master controller's snapshot consists of a simple four-bit latch (each bit representing whether a particular buffer sector has valid data or not. A logical "1" in a bit position means that particular buffer sector contained data at the time of the snapshot). This snapshot register captures the state of the four-bit status register that the DMA write logic uses to indicate which buffer sectors have data and which do not. Once the snapshot is taken, each bit that was initially set to a "1" will eventually get cleared when that buffer sector has been emptied by the DMA write buffer logic. When all bits in the snapshot register are cleared, the master controller knows the data that was in the DMA write buffer at the time the Load data arrived has now been flushed and the Load data can be delivered in a manner.

In this PHB, there are actually two master controllers to pipeline processor Load/Store traffic. To provide proper ordering for each controller, each master controller has its own snapshot logic to synchronize its Load data with the flushing of the DMA write buffer.

Dynamic Disable of PCI Interrupt Synchronization Ordering for a PCI Host Bridge

As described above, the PHB is required to order the delivery of Load data received from the PCI bus with previously received DMA write data. The PHB design, however, provides the ability to dynamically turn off this ordering rule either statically (i.e., via a mode bit) or dynamically when it detects an abnormal condition since this ordering rule may be prone to cause deadlocks.

The solution then is to implement the PCI ordering rule in such a way that allows it to be easily disabled dynamically or through a software configuration register. This is done by keeping the Load buffer independent from the DMA write buffer and imposing the ordering restriction through a simple control handshake between the two buffers that can be switched on or off.

Uses for the mode bit are:
1. dynamic switch for fault isolation
   whenever the PHB detects an error and goes into the error state, a system may still need to perform fault isolation. For this to happen, this ordering rule must be turned off in order to allow the fault isolation routines access (via Load/Store commands), to the PCI bus and internal registers inside the host bridge because the bus arbitration logic has gone into an error recovery mode where it will only grant the bus to the processor for it to perform diagnostics (all other traffic has been stopped). A deadlock would occur otherwise if inbound DMA traffic is not allowed to flush once the system enters the error state.
2. static switch by software to be disabled
   Sometimes during testing when a system experiences a deadlock condition, it is fixed by redesigning the ASIC since the deadlock is usually deep inside the ASIC. Having this mode bit allows the system to break the deadlock and do other tests. The ordering rule can be patched temporarily in software to continue testing while the hardware is being fixed.

A second convenience for having this mode bit permanently switch off is because the system performance will actually be better. The burden of maintaining the ordering rule can be handled in software or ignored completely since some special applications may not even require this rule. The net result is a system that is much less likely to have deadlock conditions.

PCI 32/64 Bit Dataflow Design for a PCI Host Bridge or a PCI Device

The PCI protocol is not a true latch to latch protocol. The PCI protocol forces the master and target control logic to use the current state of the PCI bus control signals (i.e., UNLATCHED_PCI_CNTLS(n:0)) signals to determine what should be on the data/control signals in the next cycle. This means that the master and control logic within the PHB must run the UNLATCHED_PCI_CNTLS(n:0) signals through many levels of logic before it may arrive at a latch. The number of levels of logic needed can vary greatly depending on how a PCI ASIC design decides to do its data and control flow. This can become a critical design point when it comes to meeting a faster PCI timing (i.e., 50, 66 MHz). The more levels of logic used on the UNLATCHED_PCI_CNTLS(n:0), the harder it becomes to meet the setup/hold requirements of the PCI specifications due to the length and the wide variety of fast and slow paths associated with these UNLATCHED_PCI_CNTRLS(n:0). The impacts of this may not be discovered until late in the design cycle. By then, it may be very difficult to meet the PCI bus timings. So attention must be paid to the dataflow from the onset of the design phase to minimize the impacts at the end of the phase.

Figure 10B:
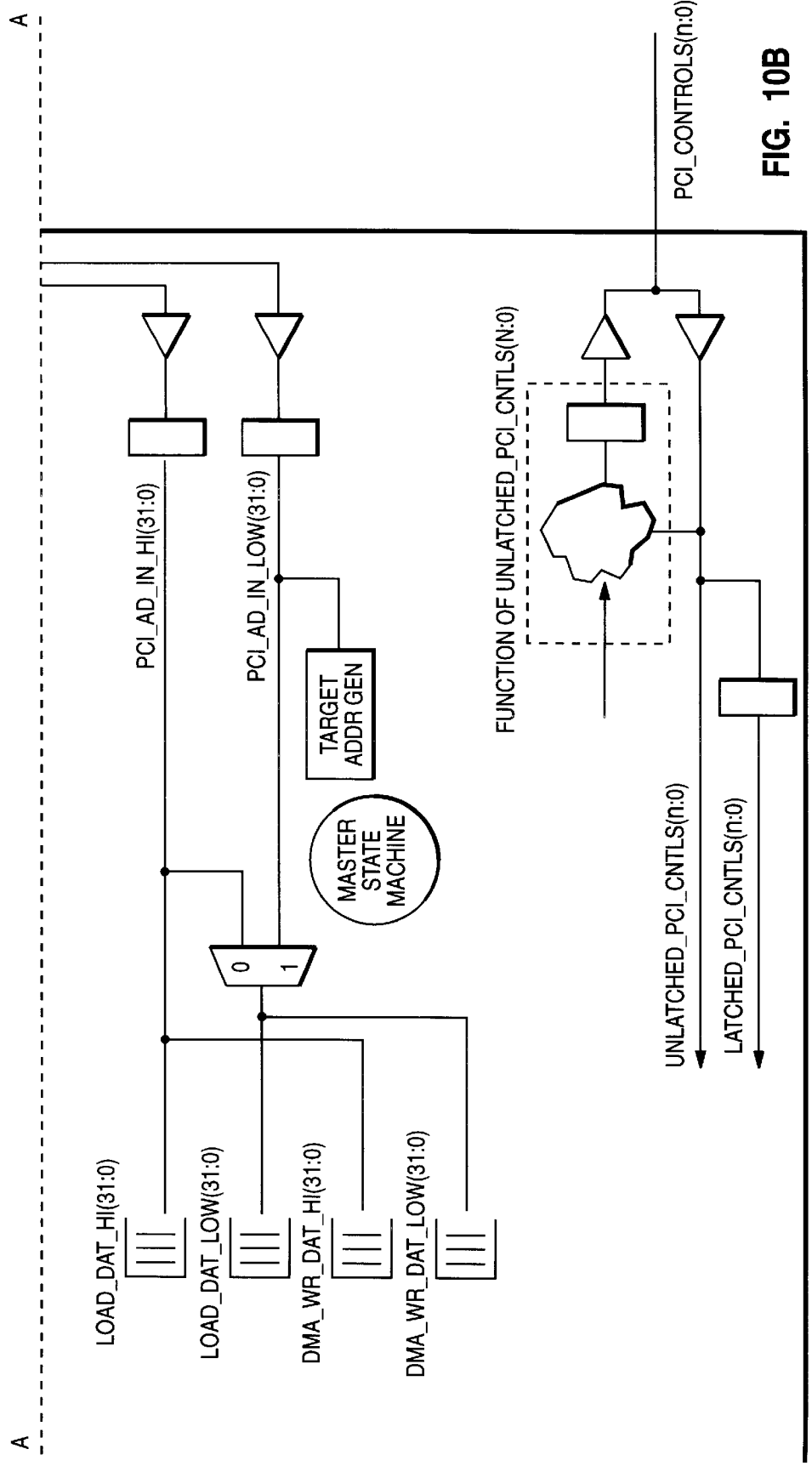
Figure 10C:
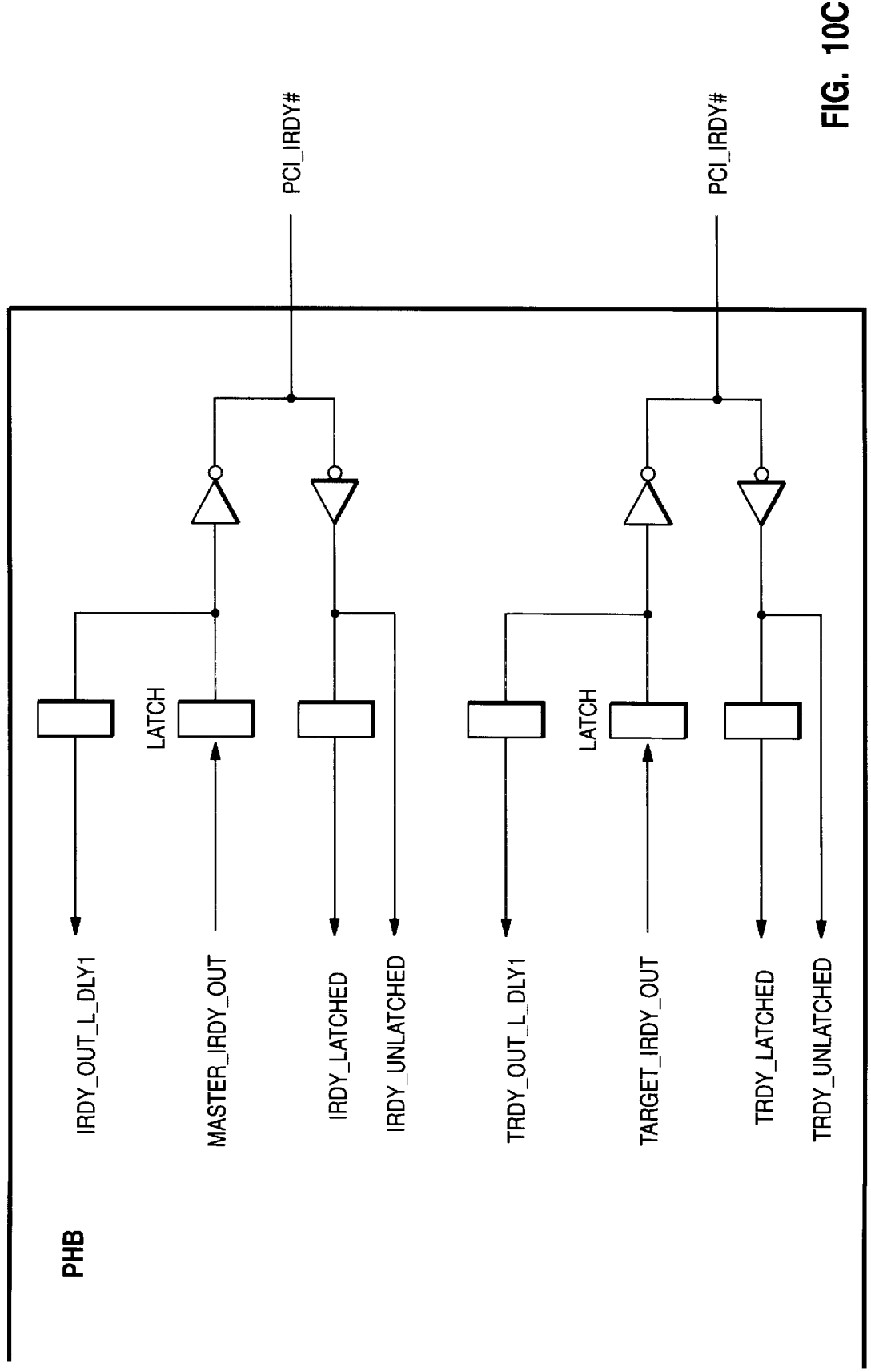
Figure 12:
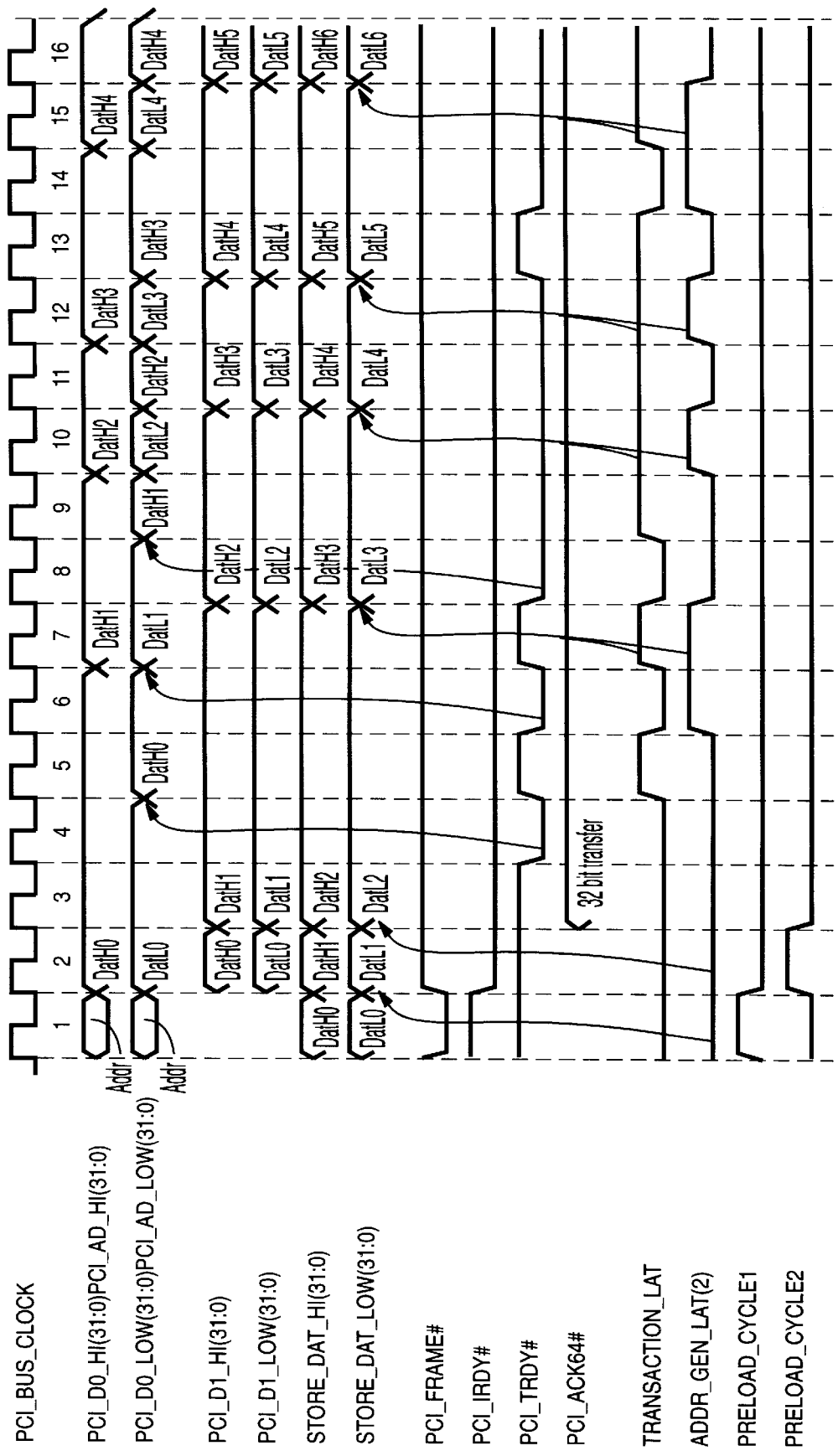
FIG. 12 is a timing diagram of an outbound dataflow of a PHB as a master doing a store to a 32-bit PCI target.
Figure 13:
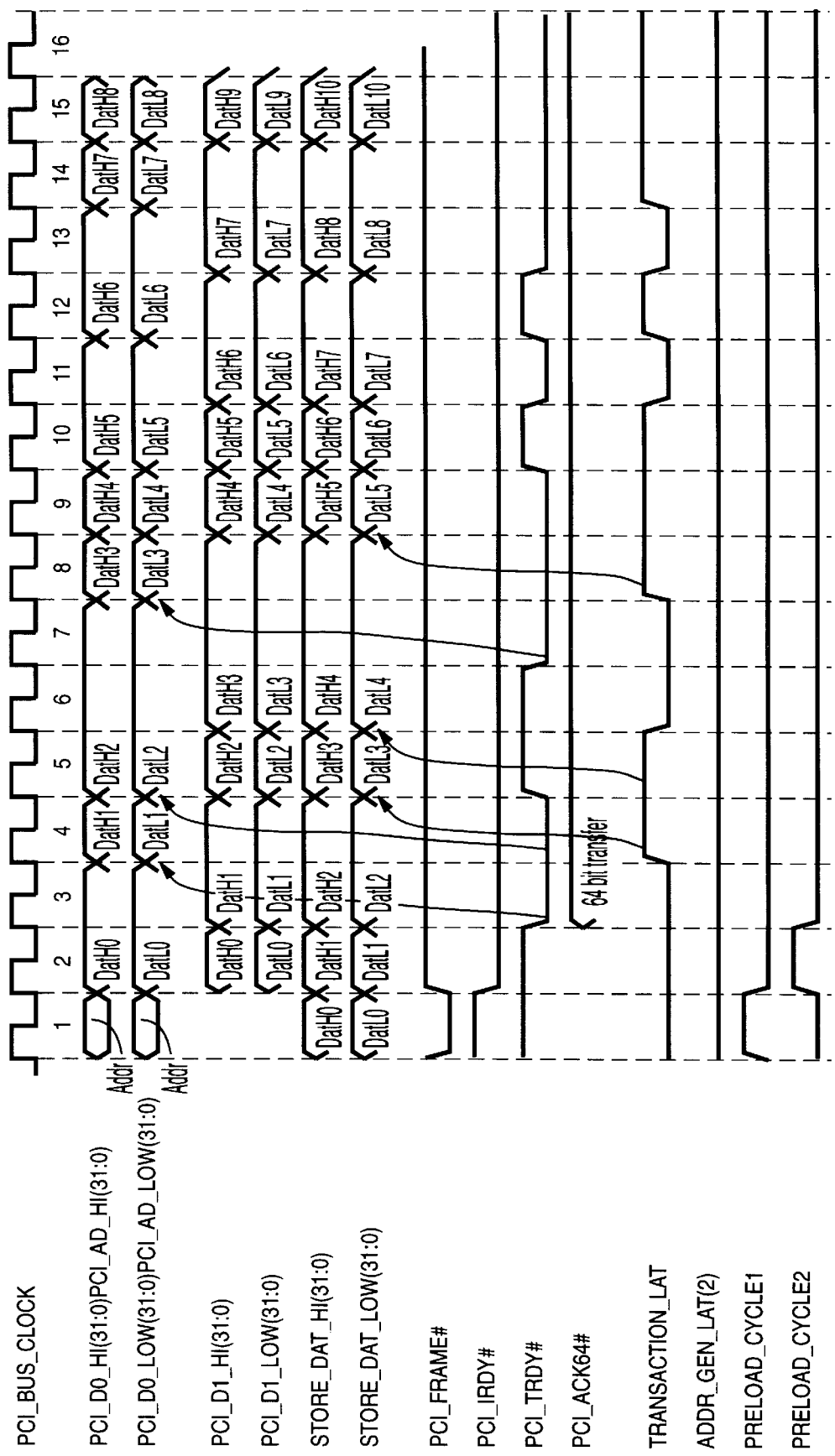
FIG. 13 is a timing diagram of an outbound dataflow of a PHB as a master doing a store to a 64-bit PCI target.
Figure 14:
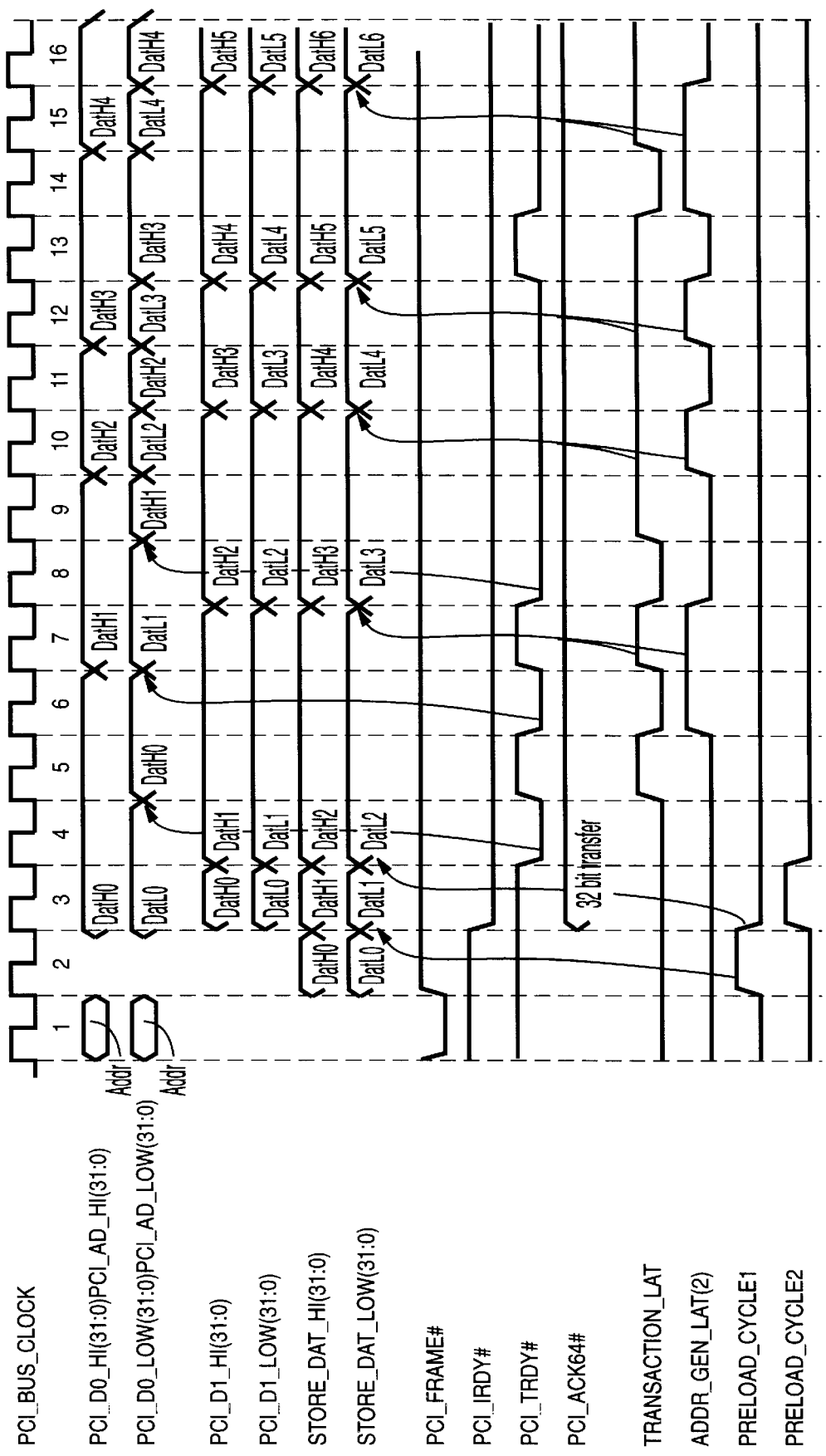
FIG. 14 is a timing diagram of an outbound dataflow of a PHB as a target for a DMA read from a 32-bit PCI Master.
Figure 15:
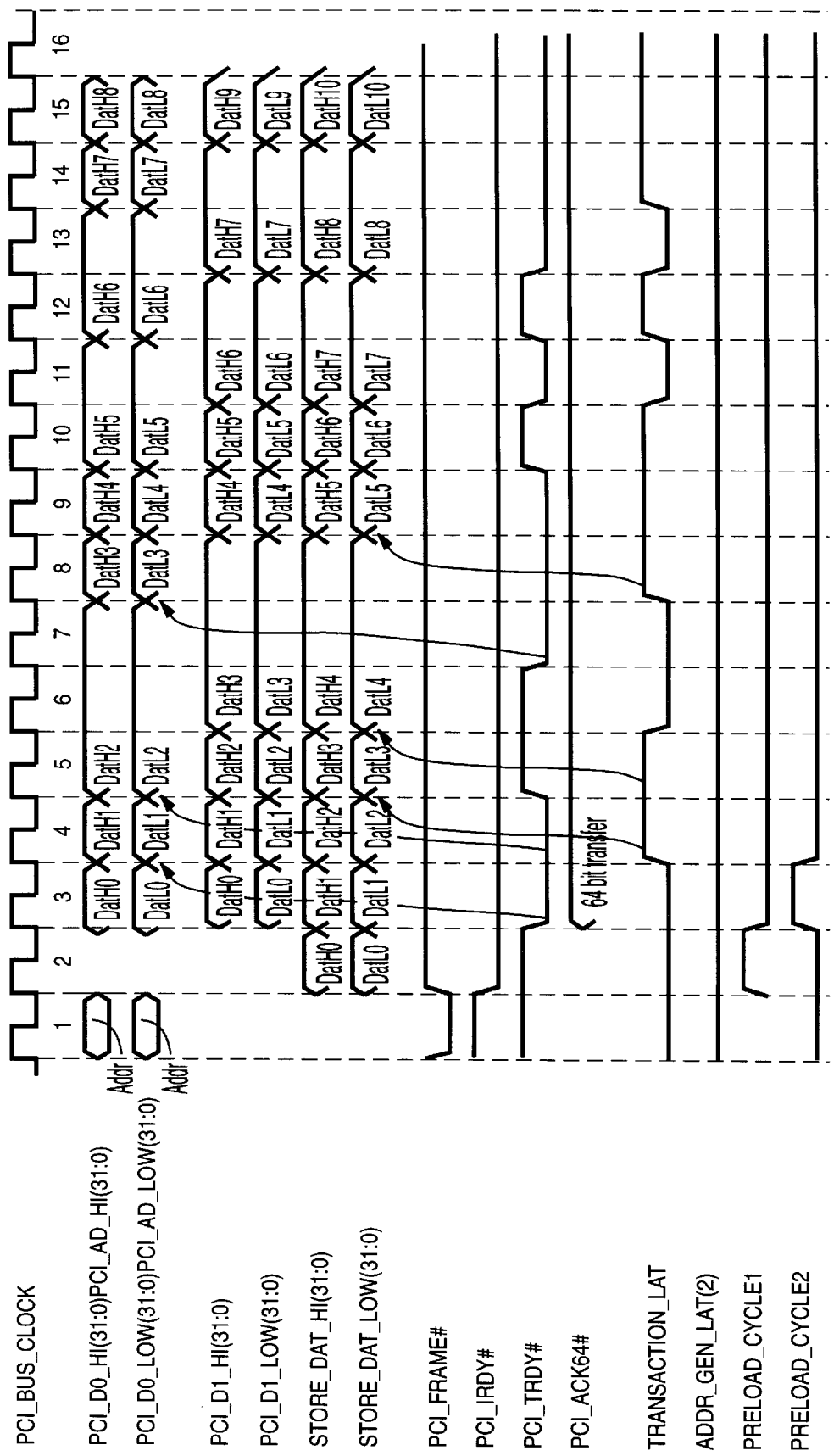
FIG. 15 is a timing diagram of an outbound dataflow of a PHB as a target for a DMA read from a 64-bit PCI target.

FIGS. 10A–10C depict a dataflow used in the PHB to solve this problem and FIGS. 11A–11C are a software implementation of this dataflow. In FIGS. 10A–10C, only the parts of the dataflow and controls that are a function of the UNLATCHED_PCI_CNTLS(n:0) are actually connected to them. This includes the data muxtiplexers and the control logic that feed the output boundary registers and control latches, respectively. The logic that feed the control output latches is simplified down to a simple set/reset term to minimize the logic levels. All other dataflow/control logic responds to the latched version (LATCHED_PCI_CNTRL (n:0)) of the PCI control signals. This includes the master/target state machines, the master/target address generator, the master/target byte counters, the master/target read/write data buffer addressing generators. As a result, the outbound dataflow has a unique structure to compensate for the delay of a cycle later. The PHB, when sending data, must be able to react to the PCI device pacing the data through the IRDY# and TRDY# signals.

The unique feature in the output bound dataflow is the 'holding register' (called PCI_D1_HI(31:0) and PCI_D1_LOW(3:0)). Because the dataflow, that is a function of the LATCHED_PCI_CNTLS(n:0), is always a cycle late in responding to what is happening on the PCI bus, this portion of the dataflow requires one holding register to save the extra words it has read from the buffer during data pacing. This holding register will be selected whenever the consumer of the data reactivates its IRDY# or TRDY# signal. With this dataflow structure, the controls become very simple and can handle any combination of data pacing for 32 bit or 64 bit PCI devices.

Both the PHB master and target logic share the same outbound and inbound dataflow. The dataflow is able to handle a 64 bit PCI transfer and will dynamically switch to supporting a 32 bit transfer in response to what the PCI device indicates it is capable of at the beginning of the transfer.

Multipurpose Sideband Port in PCI Host Bridge to Control Sideband Signals

The PCI spec allows the system designed to define sideband signals for a given system that can be used by a PCI device specially built to understand what these sideband signals mean. When using a PHB that is to be used in a system requiring different sideband signals with different definitions, the PHB can implement an internal register that exists in the processor's address map such that it can be written directly by the processor. The bits in this register are simply connected to the sideband signals for the PCI bus. This makes the PHB independent of the definition of these sideband signals. Software could then do a store to this Sideband register to set up the sideband signals properly prior to doing a store to the PCI device. The PCI device would then decode the sideband signals based on its built-in understanding. Software could then reset or change the sideband signals prior to accessing a second device to decode the sideband signals in a different manner.

Figure 16:
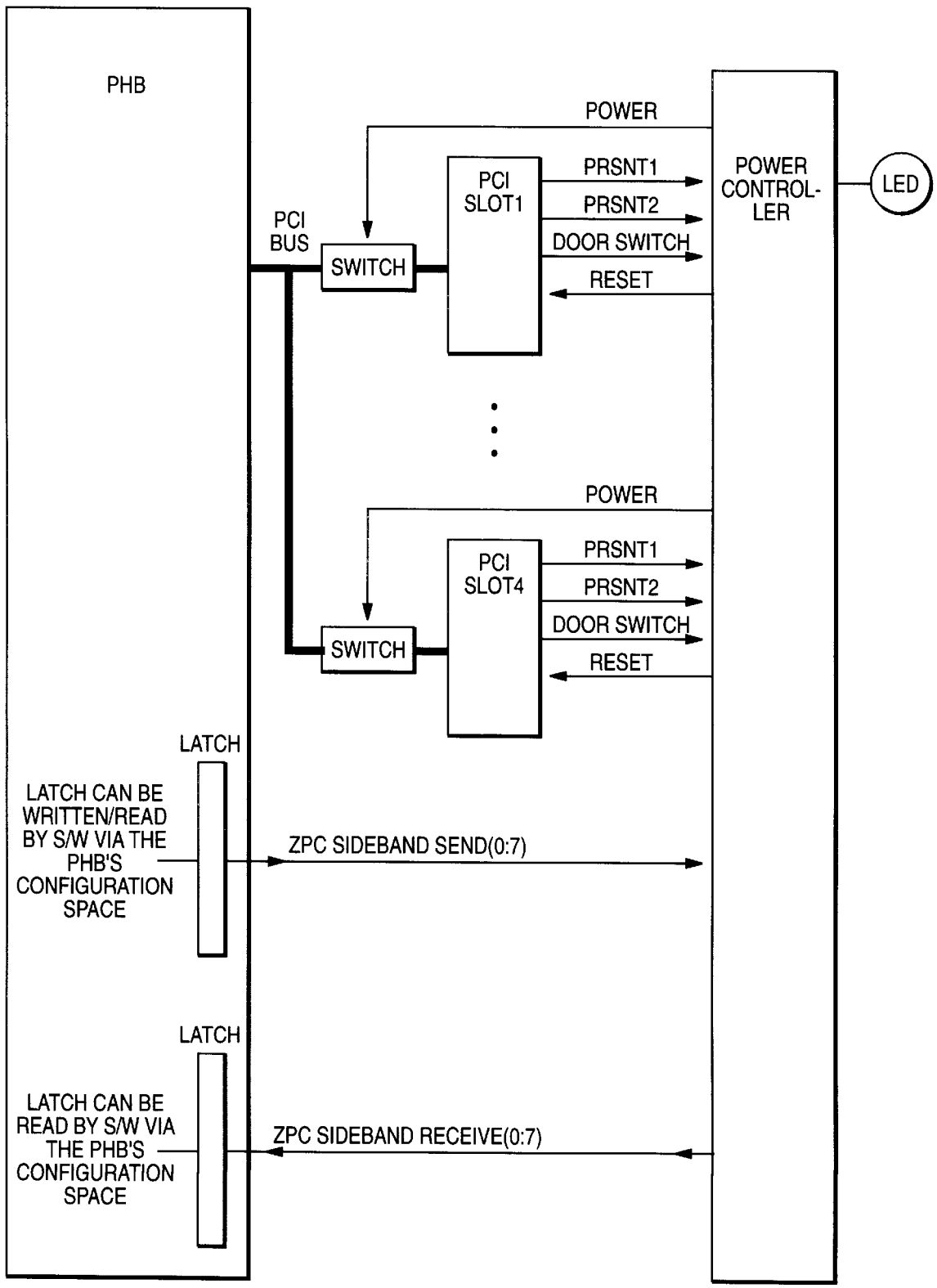
FIG. 16 is a block diagram of a hot plug connection.

FIG. 16 is a block diagram of a hot plug connection. This figure depicts one type of application where the ZPC_SIDEBAND_SEND(0:7) signals are wired to the PCI power control logic to send power-on/power-off commands to the individual PCI slots of a system that supports hot plugging. The PHB can receive commands back from the power logic through the ZPC_SIDEBAND_RECEIVE (0:7) that may contain status type information. In this example, the ZPC_SIDEBAND_SEND(0:7) and ZPC_SIDEBAND_RECEIVE(0:7) signals are used to communicate with a non-PCI device. Alternatively, ZPC_SIDEBAND_SEND(0:7) and ZPC_SIDEBAND_RECEIVE(0:7) signals could also be connected directly to a PCI device to provide sideband signals from the PHB to a PCI device. These signals could serve as discrete reset pins for the individual PCI devices or could serve as a functional indicator (i.e., serves as extra configuration or address selects from the PHB to the PCI target).

Although the present invention has been fully described above with reference to specific embodiments, other alternative embodiments will be apparent to those of ordinary skill in the art. Therefore, the above description should not be taken as limiting the scope of the present invention which is defined by the appended claims.

What is claimed is:

1. A method of assigning communication channels for transmitting data through a host bridge comprising the steps of:
   determining whether any one of said channels is selected to transfer data and whether data is presently being transmitted through any one of said channels;
   designating, if all of said channels are selected and if data is not presently being transmitted through one of said channels, said one of said channels as a new data transmission channel; and
   reselecting, if all the data channels are selected and if some of said channels are idle, a least recently used channel among said idle channels as said new data transmission channel.

2. The method of claim 1 wherein if data is not being transmitted through more than one of said channels, data transmission channel assignments are made between said more than one of said channels from a lowest channel number (e.g., channel 0) to a highest channel number (e.g., channel 7).

3. The method of claim 1 wherein if data is not being transmitted through more than one of said channels, data transmission channel assignments are made between said more than one of said channels from a highest channel number (e.g., channel 7) to a lowest channel number (e.g., channel 0).

4. An apparatus for assigning communication channels for transmitting data through a host bridge comprising:
   means for determining whether data is presently being transmitted through any one of said channels and whether any one of said channels has been selected to transfer data;

means for designating, if data is not presently being transmitted through one of said channels and if all of said channels are selected, said one of said channels as a new data transmission channel; and reselecting, if all the data channels are selected and if some of said channels are idle, a least recently used channel among said idle channels as said new data transmission channels.

5. The apparatus of claim 4 wherein if more than one of said channels is not selected, selection of a channel as a data transmission channel is made between said more than one of said channels from a lowest channel number (e.g., channel 0) to a highest channel number (e.g., channel 7).

6. The apparatus of claim 5 wherein if more than one of said channels is not selected, selection of a channel as a data transmission channel is made between said more than one of said channels from a highest channel number (e.g., channel 7) to a lowest channel number (e.g., channel 0).

* * * * *